US012659060B1

(12) United States Patent
Sun et al.

(10) Patent No.: US 12,659,060 B1
(45) Date of Patent: Jun. 16, 2026

(54) SYSTEMS AND METHODS FOR CELLULAR NETWORK COEXISTENCE

(71) Applicant: CABLE TELEVISION LABORATORIES, INC., Louisville, CO (US)

(72) Inventors: Ruoyu Sun, Westminster, CO (US); Yunjung Yi, Vienna, VA (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 287 days.

(21) Appl. No.: 18/598,680

(22) Filed: Mar. 7, 2024

Related U.S. Application Data

(60) Provisional application No. 63/547,524, filed on Nov. 6, 2023, provisional application No. 63/533,557, filed on Aug. 18, 2023, provisional application No. 63/467,096, filed on May 17, 2023, provisional application No. 63/467,099, filed on May 17, 2023, provisional application No. 63/450,431, filed on Mar.

(Continued)

(51) Int. Cl.
*H04B 17/345* (2015.01)
*H04W 24/08* (2009.01)

(52) U.S. Cl.
CPC .......... *H04B 17/345* (2015.01); *H04W 24/08* (2013.01)

(58) Field of Classification Search
None
See application file for complete search history.

(56) References Cited

U.S. PATENT DOCUMENTS 6,049,717 A * 4/2000 Dufour ................ H04W 24/02
455/446
6,085,094 A * 7/2000 Vasudevan ............ H04B 7/005
455/448

(Continued)

OTHER PUBLICATIONS

Cablelabs, Charter Communications; "Simulation assumptions for SBFD adjacent channel coexistence study on the UMa-to-UMi scenario;" 3GPP TSG-RAN WG4 Meeting # 106; R4-2300143; Athens, Greece, Feb. 27-Mar. 3, 2023; Agenda item 9.19.2.1 (Year: 2023).

(Continued)

*Primary Examiner* — Faruk Hamza
*Assistant Examiner* — Cassandra L Decker
(74) *Attorney, Agent, or Firm* — Volpe Koenig

(57) ABSTRACT

A method is provided for analyzing interference for a first cellular network overlapping an adjacent second cellular network. The method includes steps of determining a first distribution of co-channel cellular sites for the first cellular network, establishing a first co-channel cellular site of the first distribution as a center cell, measuring co-channel interference from each other co-channel cellular site with respect to the center cell, determining a second distribution of adjacent channel cellular sites for the second cellular network, measuring adjacent channel interference from each adjacent channel cellular site with respect to the center cell, and aggregating the measured co-channel interference with the measured adjacent channel interference. Each of the co-channel cellular sites are separated from other co-channel cellular sites by a first inter-site distance (ISD), and each of the adjacent channel cellular sites are separated from other adjacent channel cellular sites by a second ISD.

17 Claims, 29 Drawing Sheets

Related U.S. Application Data 7, 2023, provisional application No. 63/450,429, filed on Mar. 7, 2023.

(56) References Cited

U.S. PATENT DOCUMENTS

| | | | | |
|---|---|---|---|---|
| 2004/0092256 A1* | 5/2004 | Keller | ................... | H04W 16/02 |
| | | | | 455/500 |
| 2010/0113060 A1* | 5/2010 | Bai | ....................... | H04W 16/14 |
| | | | | 455/450 |

OTHER PUBLICATIONS

Charter Communications Inc., Cable Labs; "Adjacent channel co-existence use-case of non-overlapping sub band full duplex (SBFD) between n48 and n77;" 3GPP TSG-RAN WG4 Meeting # 106; R4-2300145; Meeting, Feb. 27-Mar. 3, 2022; Agenda item: 9.19.2.1 (Year: 2022).

Samsung, "Simulation assumptions for SBFD adjacent channel co-existence study;" 3GPP TSG-RAN WG4 Meeting # 105; R4-2220247; Toulouse, France, Nov. 14-18, 2022; Agenda item: 8.18.2.1 (Year: 2022).

* cited by examiner

Legacy TDD networks

Legacy TDD vs. SBFD network

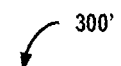
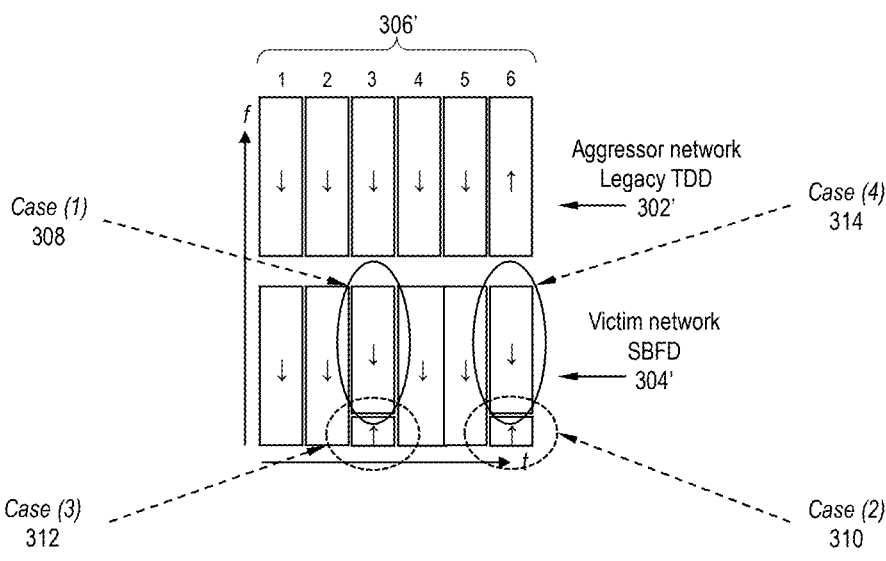
FIG. 3B

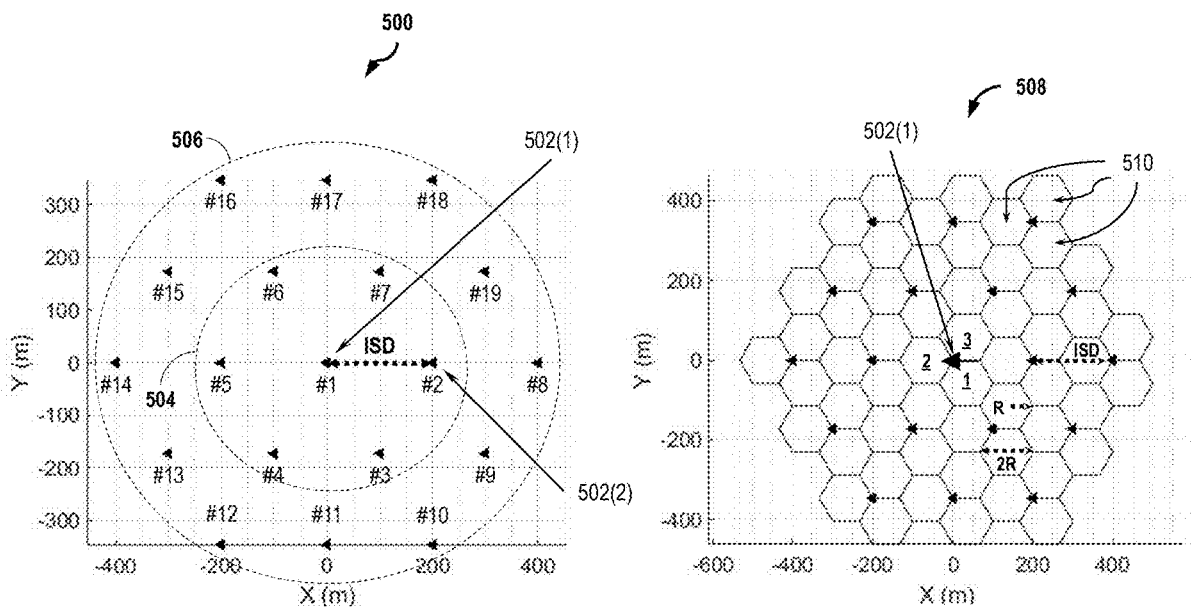
FIG. 5A                              FIG. 5B

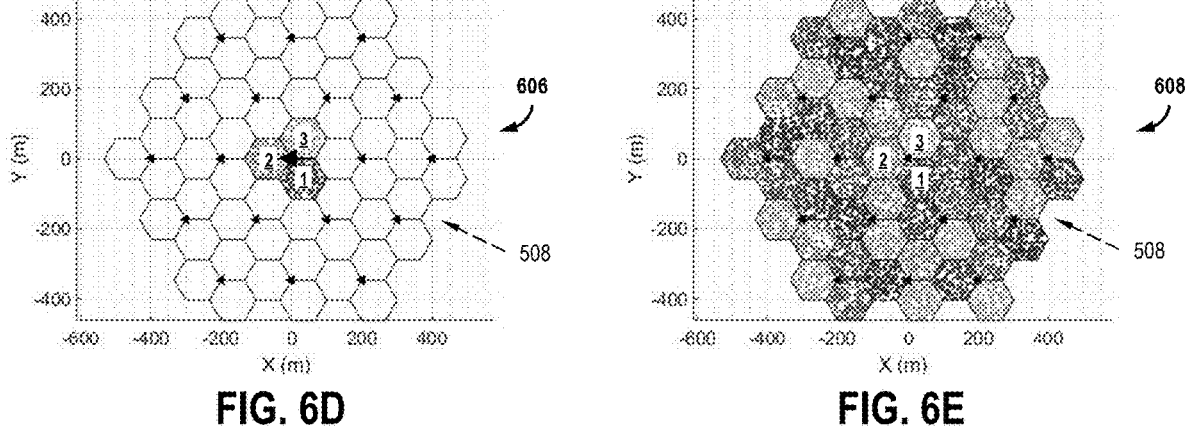
FIG. 6D                                    FIG. 6E

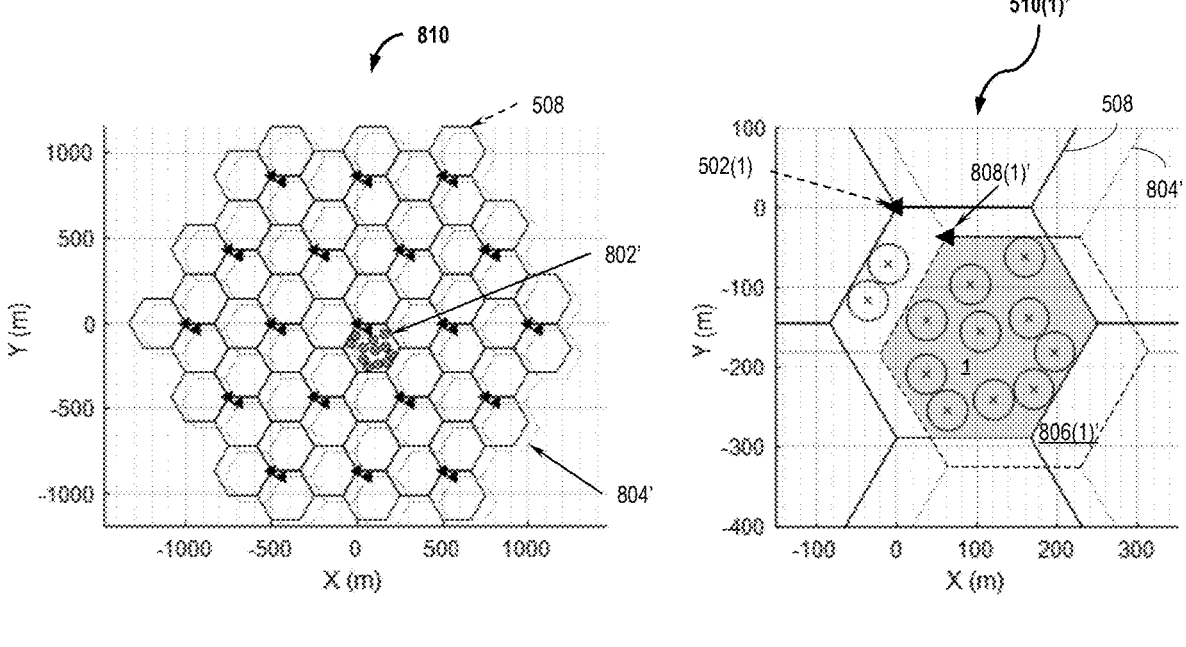
FIG. 8C                    FIG. 8D

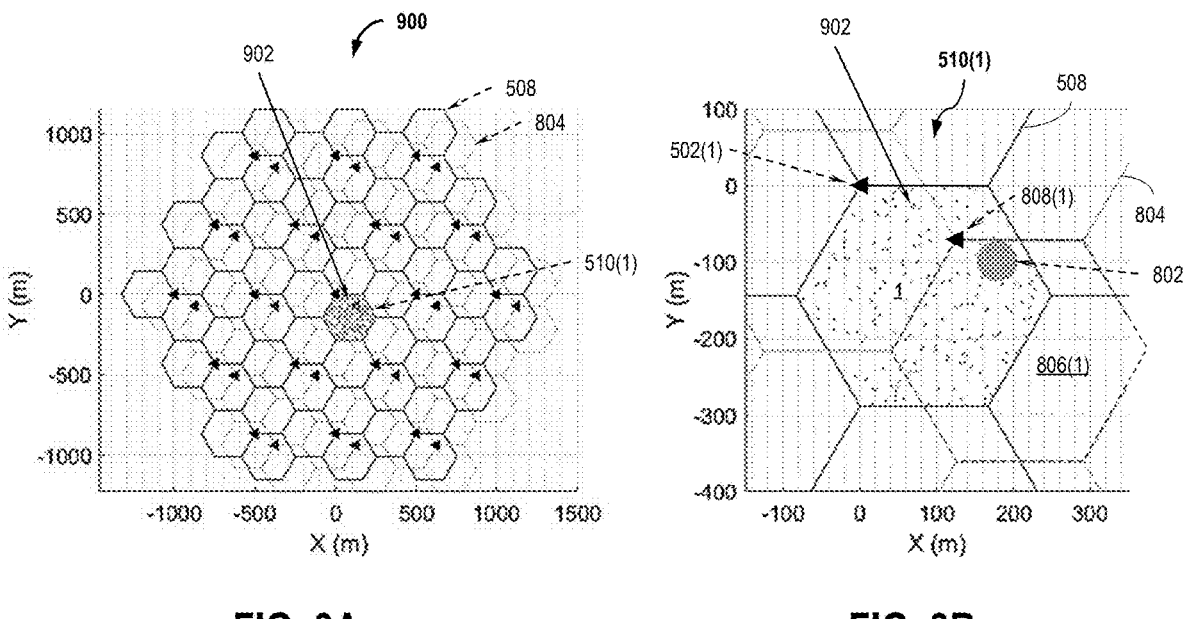
FIG. 9A                    FIG. 9B

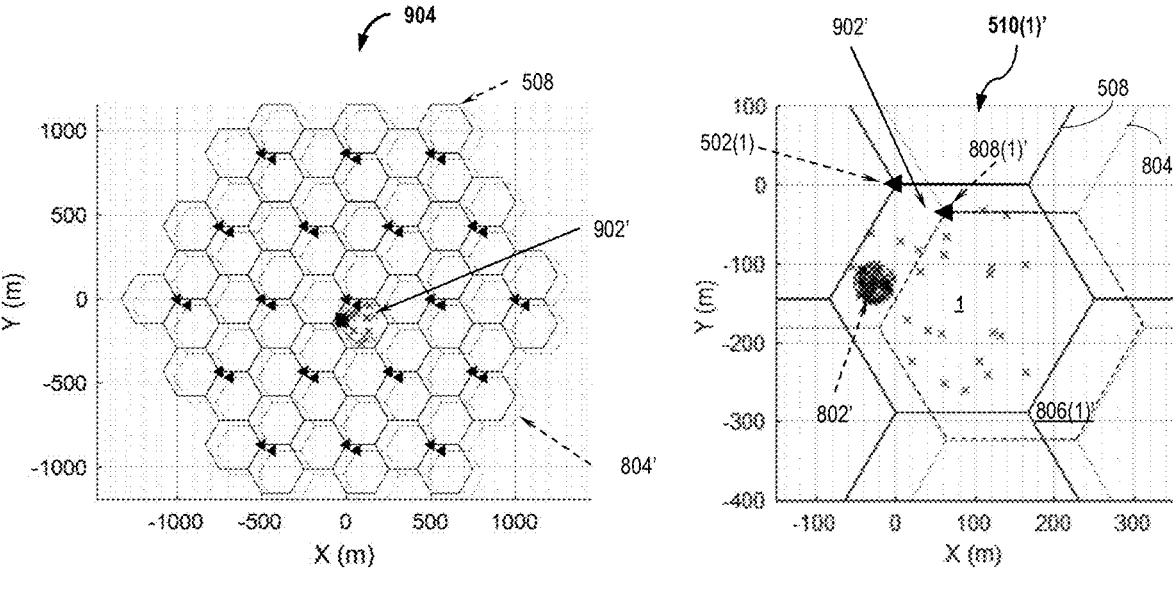
FIG. 9C                              FIG. 9D

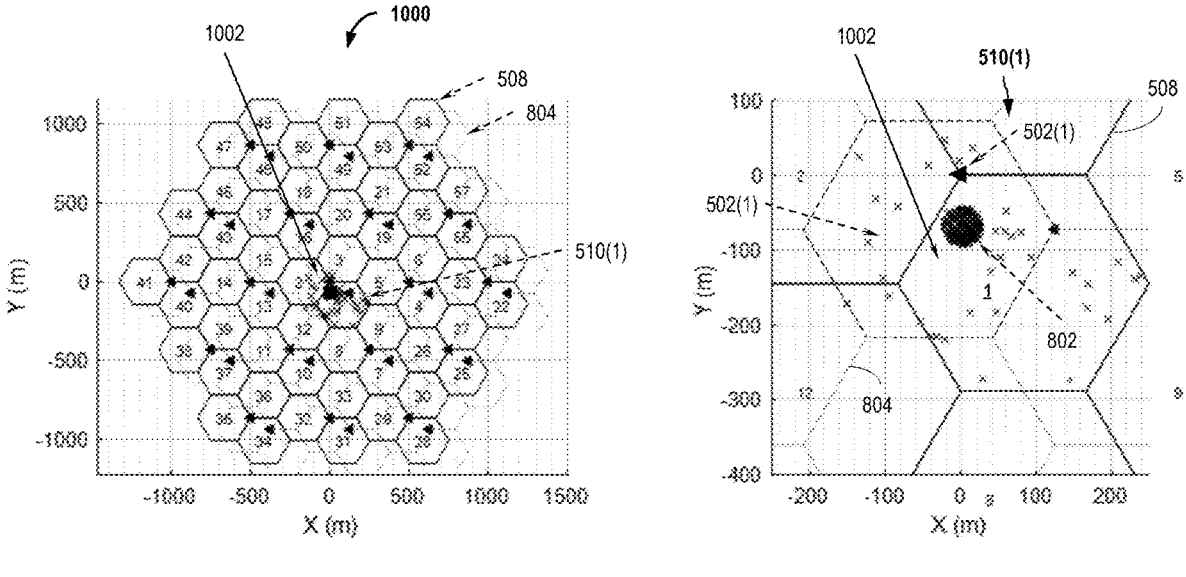
FIG. 10A                    FIG. 10B

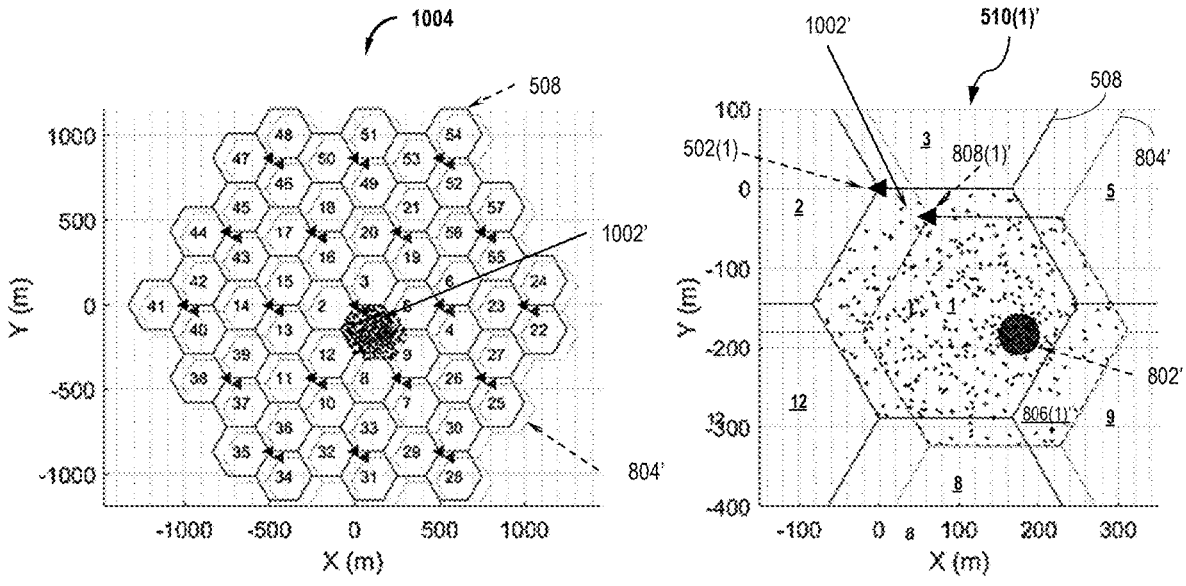
FIG. 10C                    FIG. 10D

1100

1400

SYSTEMS AND METHODS FOR CELLULAR NETWORK COEXISTENCE

CROSS REFERENCE TO RELATED APPLICATIONS

This application claims the benefit of and priority to U.S. Provisional Application No. 63/450,429, filed Mar. 7, 2023, U.S. Provisional Application No. 63/450,431, filed Mar. 7, 2023, U.S. Provisional Application No. 63/467,096, filed May 17, 2023, U.S. Provisional Application No. 63/467,099, filed May 17, 2023, U.S. Provisional Application No. 63/533,557, filed Aug. 18, 2023, and to U.S. Provisional Application No. 63/547,524, filed Nov. 6, 2023. All of these prior applications are hereby incorporated by reference in their entireties.

BACKGROUND

The field of the invention relates generally to communication systems, and more specifically, to systems and methods regarding coexistence between cellular networks.

The Third Generation Partnership Project (3GPP) sets standards for mobile and cellular telecommunications technologies, including radio access, core network, and service capabilities. These standards are defined by a number of 3GPP Technical Specifications (TSs) and Technical Reports (TRs), which further provide hooks for non-radio access to the core network, and for interworking with non-3GPP networks. 3GPP technologies continue to evolve to cover further generations beyond 3G, including Fifth Generation (5G) and Long Term Evolution (LTE) networks and communications. Within 3GPP, the Radio Access Network Working Group 4 (or RAN WG4) is a technical group addressing radio aspects of Long-Term Evolution (LTE) and New Radio (NR) systems for 4G and 5G mobile networks, respectively, including through a variety of R4 submissions.

3GPP TR 38.858 studies the evolution of NR duplex operation, examining coexistence between conventional time division duplex (TDD) deployments, and deployments using new technologies, such as sub-band non-overlapping full duplex (SBFD). 3GPP TR 38.858 recognized different schemes for urban macro (UMa) deployments, which are typically large, high-powered base stations having a wide coverage area (e.g., hundreds of meters to kilometers) for densely populated urban areas, and for urban micro (UMi) deployments, such as small cells, which are typically low-powered base stations deployed within urban environments having a smaller coverage area (e.g., tens to hundreds of meters) to enhance capacity and coverage in areas with high user density.

FIG. 1 is a schematic illustration depicting a conventional sub-band full duplex (SBFD) principle 100. In the embodiment depicted in FIG. 1, SBFD principle 100 is illustrated with respect to a legacy TDD scheme 102. TDD scheme 102 is depicted as implementing half duplex over a plurality of time slots 104 (six timeslots, in this example), with the first five time slots 104(1-5) being utilized for downlink (DL) traffic, and the last time slot 104(6) being utilized for uplink (UL) traffic. For such DL-heavy TDD configurations, the UL latency may be significantly large.

For SBFD. full duplex may be achieved in each time slot 104 by dividing the frequency bandwidth (i.e., vertical axis) into DL and UL bandwidth parts (BWPs). Accordingly, in a first SBFD scheme 106, third time slot 104(3)' is depicted to contain an SBFD UL BWP in DL slot, that is, one UL BWP and one DL BWP. The remaining time slots 104' resemble the UL/DL configuration for legacy TDD scheme 102. In a second SBFD scheme 108, the UL BWP is still contained within third time slot 104(3) ", but within the bandwidth such that third time slot 104(3)" contains the one UL BWP, but two DL BWPs. In this DL scenario, SBFD implementation improves UL latency and throughput in comparison with legacy TDD techniques. However, such conventional SBFD DL schemes are known to experience inter-channel, inter-band, or inter-operator interference between communication devices, such as a mobile user equipment device (UE), i.e., UE-to-UE interference.

Third SBFD scheme 110 and fourth SBFD scheme 112 are similar to first and second SBFD schemes 106 and 108, respectively, except that third and fourth SBFD schemes 110, 112 illustrate SBFD implementation in the UL scenario (i.e., time slot 104(6), in this example). In third SBFD scheme 110, time slot 104(6)''' contains one DL BWP and one UL BWP. In fourth SBFD scheme 112, time slot 104(6)''' contains one UL BWP between two DL BWPs. In this UL scenario, SBFD implementation improves DL latency and throughput in comparison with legacy TDD techniques. However, such conventional SBFD UL schemes are known to experience inter-channel, inter-band, or inter-operator interference between base stations, i.e., BS-to-BS interference. Heretofore, SBFD UL schemes have been considered low priority within the 3GPP paradigm, due to such harmful effects on coexistence.

FIG. 2 is a schematic illustration depicting a conventional TDD principle 200. In the exemplary embodiment depicted in FIG. 2A, TDD principle 200 illustrates a scenario for TDD synchronization between two adjacent-channel/band networks, namely a first TDD network 202 and a second TDD network 204. In this example, first network 202 is illustrated as a "victim network" relative to second network 204, which is illustrated as an "aggressor network" in an adjacent channel/band in which victim first network 202 operates. A time frame for each network contains a plurality of time slots 206 (six time slots 206(1-6), in this example) and, for this example, the starting point of each time frame is aligned. 3GPP TS 36.133 and 3GPP TS 38.133, for example, require a ±1.5 us time error for such time frame alignment.

Accordingly, for purposes of this description, "TDD synchronization" refers to the scenario where two TDD networks use the same TDD configuration and alignment of time frame starting points (e.g., 3GPP TS 38.133, which describes how the time error between two base station must be within three microseconds, i.e., much smaller than a symbol duration or time slot interval). Co-channel cells from the same operator are assumed to be TDD-synchronized.

Accordingly, between first and second TDD networks 202, 204, TDD synchronization is achieved through choosing a same or similar TDD network configuration between: (a) LTE and LTE; (b) NR and NR having a same or different subcarrier spacing; and/or (c) LTE and NR. For this synchronization of TDD principle 200, interference (e.g., comparison of signal-to-noise ratio (SNR) or signal-to-interference-plus-noise ratio (SINR) values) may be considered for four cases: (1) DL-to-DL (time slots 206(1-5)); (2) UL-to-UL (time slot 206(6)); (3) DL-to-UL (e.g., BS-to-BS); and (4) UL-to-DL (e.g., UE-to-UE). As can be seen from FIG. 2, for two TDD networks, interference considerations are relevant for cases (1) and (2), but not for cases (3) and (4).

For this legacy TDD-TDD scenario, the SNR values may include wanted signal and noise, without considering interference from neighboring cells. Similarly, the SINR may be considered without adjacent channel interference (ACI), i.e., the interference comparison may include only intra-network co-channel interference from neighboring cells. A baseline SINR may then be established such that the interference is aggregated by both co-channel interference and ACI (i.e., assuming that the adjacent-channel aggressor second network 204 also uses legacy TDD, and that both networks 202, 204 are TDD-synchronized, as described above, to use the same TDD configuration and frame alignment), such that there is no harmful DL-to-UL (case (3), e.g., BS-to-BS) ACI, or UL-to-DL (case (4), e.g., UE-to-UE) ACI.

FIG. 3A is a schematic illustration depicting a coexistence challenge effect 300 between a conventional TDD network 302 and a conventional SBFD network 304. Coexistence challenge effect 300 is similar, in several aspects, to TDD principle 200, FIG. 2, and depicts TDD network 302 as the victim network. Different though, from TDD principle 200, for coexistence challenge effect 300, SBFD network 304 is illustrated to be the aggressor network aligned to a same plurality of time slots 306 as victim TDD network 302. Interference is then considered for the same four cases considered for TDD principle 200: (1) DL-to-DL (time slots 306(1-6)); (2) UL-to-UL (time slot 306(6)); (3) DL-to-UL (time slot 306(6), e.g., BS-to-BS); and (4) UL-to-DL (time slot 306(3), e.g., UE-to-UE). As can be seen from FIG. 3A, in the case of TDD network 302 coexisting with SFBD network 304, interference considerations become relevant for all four cases (1) through (4).

More particularly, for cases (1) and (2), four SNR values (e.g., wanted signal and noise without interference) and four SINR values (e.g., intra-network co-channel interference from neighbor cells, without ACI) are compared when legacy TDD network 302 is the victim and SBFD 304 is the aggressor. However, for cases (3) and (4), the SINR values are considered with ACI. That is, the interference is aggregated by both co-channel interference and ACI (i.e., assuming the adjacent-channel aggressor network uses SBFD), and therefore the ACI must be considered for the DL-to-UL scenario (case (3), e.g., BS-to-BS) and the UL-to-DL scenario (case (4), e.g., UE-to-UE). However, as may be seen from FIG. 3A, implementation of SBFD by the aggressor effectively renders TDD synchronization impossible for cases (3) and (4).

FIG. 3B is a schematic illustration depicting a coexistence challenge effect 300' between a conventional TDD network 302' and a conventional SBFD network 304'. Coexistence challenge effect 300' is similar to coexistence challenge effect 300, FIG. 3A, except in this example, TDD network 302' is the aggressor, and SBFD network 304' is the victim. Interference is then considered for the same four cases (1)-(4) considered for coexistence challenge effect 300, with the following additional considerations and observations.

For case (1), a first SBFD operation 308 is DL in a DL slot (e.g., time slot 306(3)'), and this SBFD DL operation 308 is impacted by the ACI of the legacy TDD DL in the same time slot 306(3)' (e.g., BS-to-UE) in a manner similar to the effect of TDD-to-TDD ACI (e.g., FIG. 1), or SBFD-to-SBFD ACI. It may be noted that such DL-DL impact need not be considered for case (3), discussed below.

For case (2), a second SBFD operation 310 is UL in a UL slot (e.g., time slot 306(6)'), and this SBFD UL operation 310 is impacted by the ACI of the legacy TDD DL in the same time slot 306(6)' (e.g., UE-to-BS) in a manner similar to the effect of TDD-to-TDD ACI (e.g., FIG. 1), or SBFD-to-SBFD ACI (e.g., FIG. 2A. It may be noted that such UL-UL impact need not be considered for case (4), discussed below.

For case (3), a third SBFD operation 312 is UL in a DL slot (e.g., time slot 306(3)'), and this SBFD UL operation 312 is impacted by the ACI of the legacy TDD DL in the same time slot 306(6)' (e.g., BS-to-BS). Thus, for case (3), introduction of SBFD in the presence of an aggressor TDD network creates a particular challenge to coexistence of these different conventional networks For case (4), a fourth SBFD operation 314 is DL in a UL slot (e.g., time slot 306(6)'), and this SBFD DL operation 314 is impacted by the ACI of the legacy TDD DL in the same time slot 306(6)' (e.g., UE-to-UE). Thus, for case (4), introduction of SBFD in the presence of an aggressor TDD network creates another particular challenge to coexistence of these different conventional networks For the cases (3) and (4) example, three SNR and SINR values are compared for SBFD network 304' as the victim and legacy TDD network 302' as the aggressor. For the SINR values, SINR is considered with ACI, and the interference is aggregated by both co-channel interference and ACI. The value comparisons described above have been submitted to the RAN WG4, and then published in one or more R4 submissions, the subject matter of which is incorporated by reference herein.

However, at the time of the present inventions, 3GPP TR 38.858 lacked sufficient evaluation techniques for UMi-to-UMi coexistence, and did not address UMa-to-UMi coexistence for the TDD and SBFD deployment schemes described above with respect to FIGS. 1-3B. Accordingly, there is a need in this field to develop improved UMi-to-UMi evaluation processes, and additionally, to evaluate the UMa-to-UMi coexistence paradigm in particular.

SUMMARY

In an embodiment, a method is provided for analyzing interference for a first cellular network overlapping an adjacent second cellular network. The method includes a step of determining a first distribution of co-channel cellular sites for the first cellular network. Each co-channel cellular site of the first distribution is separated from a nearest other co-channel cellular site by a first inter-site distance (ISD). The method further includes steps of establishing a first co-channel cellular site of the first distribution as a center cell, measuring co-channel interference from each other co-channel cellular site with respect to the center cell, and determining a second distribution of adjacent channel cellular sites for the second cellular network. Each adjacent channel cellular site of the second distribution is separated from a nearest other adjacent channel cellular site by a second ISD. The method further includes steps of measuring adjacent channel interference from each adjacent channel cellular site with respect to the center cell, and aggregating the measured co-channel interference with the measured adjacent channel interference.

In an embodiment, a method is provided for analyzing interference for a first cellular network that overlaps an adjacent second cellular network. The method includes a step of defining a network grid for the first cellular network. The network grid includes a victim cellular site of a plurality of co-channel cellular sites within the network grid. The method further includes steps of generating a plurality of random victim user equipment (UE) locations about the victim cellular site, calculating a received power value and signal-to-noise ratio (SNR) for the victim cellular site, determining co-channel intra-network time division duplex (TDD) interference to the victim cellular site from the remaining plurality of co-channel cellular sites based on the received power value and SNR, calculating a first signal-to-interference-plus-noise ratio (SINR) based on the co-channel intra-network TDD interference, determining adjacent channel inter-network sub-band full duplex (SBFD) interference to the victim cellular site from the adjacent second cellular network, calculating a second SINR based on a combination of the determined co-channel intra-network TDD interference and adjacent channel inter-network SBFD interference, and converting the calculated second SINR to throughput.

In an embodiment, a method is provided for analyzing interference at a victim receiver of a first cellular network operating in a first channel from an aggressor transmitter of a second cellular network operating in a second channel adjacent the first channel. The method includes steps of applying a masking first frequency filter to a transmission of the aggressor transmitter, applying a second frequency filter for a desired signal received by the victim receiver in the first channel, calculating an adjacent-channel leakage ratio (ACLR) value for the aggressor transmitter based on an overlap of the first and second frequency filters within a first bandwidth of the first channel, calculating an adjacent channel selectivity (ACS) value for the victim receiver based on an overlap of the first and second frequency filters within a second bandwidth of the second channel, and deriving a corresponding adjacent-channel interference ratio (ACIR) from the calculated ACLR and ACS values.

BRIEF DESCRIPTION

These and other features, aspects, and advantages of the present disclosure will become better understood when the following detailed description is read with reference to the following accompanying drawings, in which like characters represent like parts throughout the drawings.

FIG. 3B is a schematic illustration depicting a coexistence challenge effect between a conventional time division duplex network and a conventional sub-band full duplex network.

FIG. 5A is a graphical illustration depicting an inter-site distribution scheme for a plurality of cellular sites, in accordance with an embodiment.

FIG. 5B is a graphical illustration depicting a sector topology for the inter-site distribution scheme depicted in FIG. 5A.

FIGS. 6A-E are graphical illustrations depicting UE deployments for the sector topology depicted in FIG. 5B.

Figure 7A:
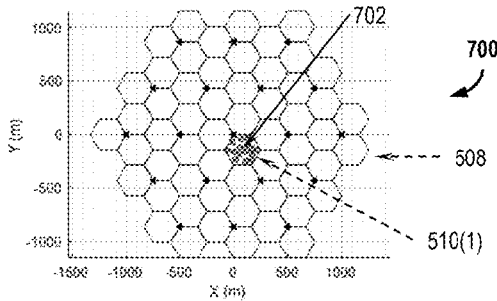

FIG. 7A is a graphical illustration depicting a distribution of clustered devices within a sector of the sector topology depicted in FIG. 5B.

Figure 7B:
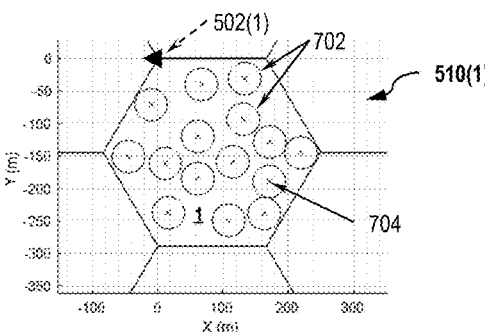

FIG. 7B is a close-up view of the sector depicted in FIGS. 5B, 7A.

Figure 7C:
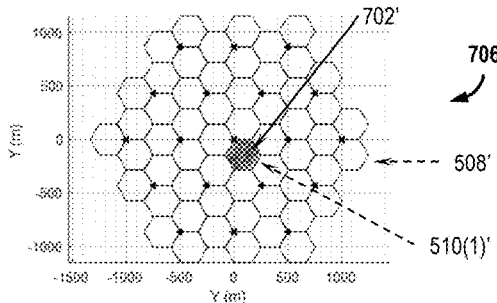

FIG. 7C is a graphical illustration depicting a distribution of clustered devices within a sector of the sector topology depicted in FIG. 5B.

Figure 7D:
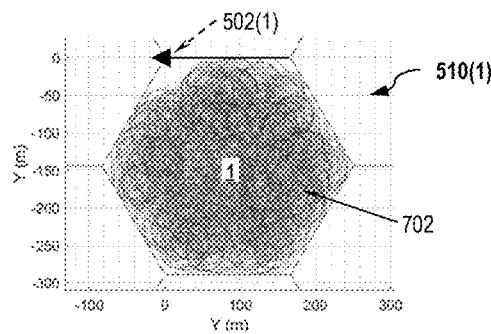

FIG. 7D is a close-up view of the sector depicted in FIGS. 5B, 7C.

Figures 8A, 8B:
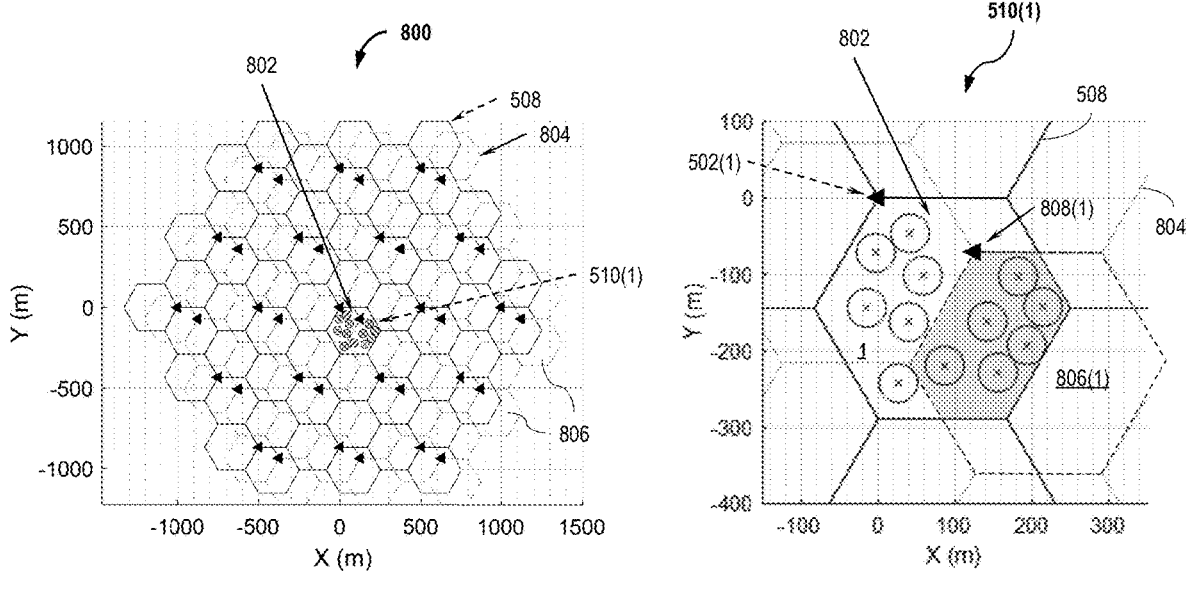

FIG. 8A is a graphical illustration depicting an exemplary clustered device distribution among adjacent channels according to the sector topology depicted in FIG. 5B.

FIG. 8B is a close-up view of the sector depicted in FIGS. 5B, 8A.

FIG. 8C is a graphical illustration depicting an alternative clustered device distribution among adjacent channels according to the sector topology depicted in FIG. 5B.

FIG. 8D is a close-up view of the sector depicted in FIGS. 5B, 8A.

FIG. 9A is a graphical illustration depicting an exemplary victim device distribution within the sector depicted in FIGS. 5B, 8A.

FIG. 9B is a close-up view of the sector depicted in FIGS. 5B, 9A.

FIG. 9C is a graphical illustration depicting an alternative victim device distribution within the sector depicted in FIGS. 5B, 8C.

FIG. 9D is a close-up view of the sector depicted in FIGS. 5B, 9C.

FIG. 10A is a graphical illustration depicting an exemplary aggressor device distribution within the sector depicted in FIGS. 5B, 8A, 9A.

FIG. 10B is a close-up view of the sector depicted in FIGS. 5B, 10A.

FIG. 10C is a graphical illustration depicting an alternative aggressor device distribution within the sector depicted in FIGS. 5B, 8C, 9C.

FIG. 10D is a close-up view of the sector depicted in FIGS. 5B, 10C.

Figure 11:
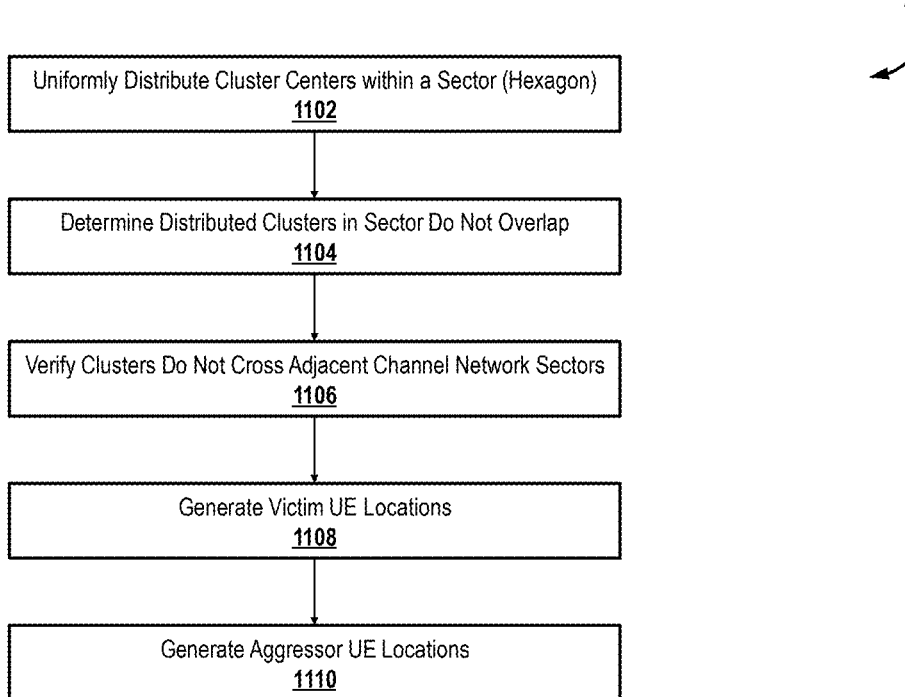

FIG. 11 is a flow diagram depicting an exemplary device distribution process for the sector depicted in FIGS. 5B, 8A-10D.

FIGS. 12A-D are graphical illustrations depicting exemplary grid shift effects for the adjacent channels depicted in FIGS. 5B, 8A-10D.

FIGS. 13A-D are graphical illustrations depicting alternative grid shift effects for adjacent channels.

Figure 14:
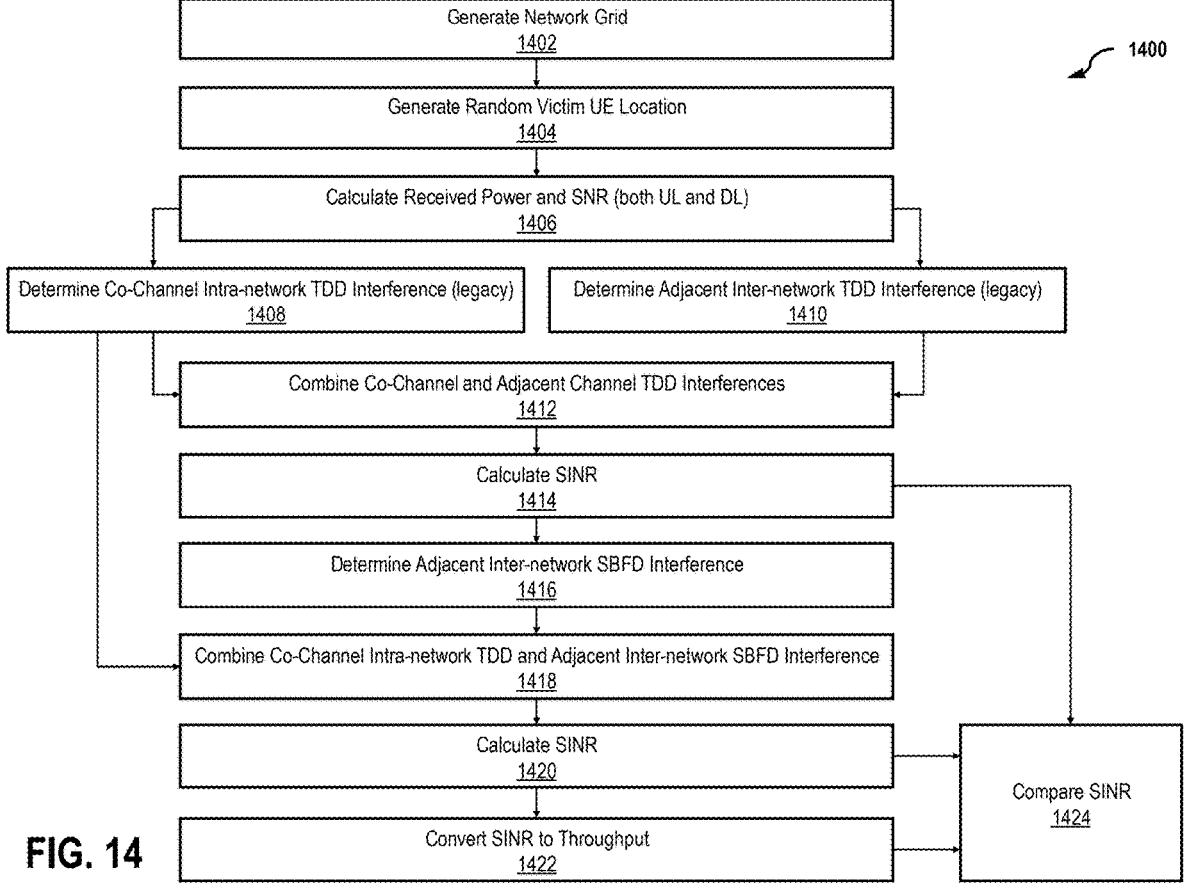

FIG. 14 is a flow diagram depicting an exemplary signal-to-interference-and-noise-ratio determination process for adjacent channel networks.

Figure 15:
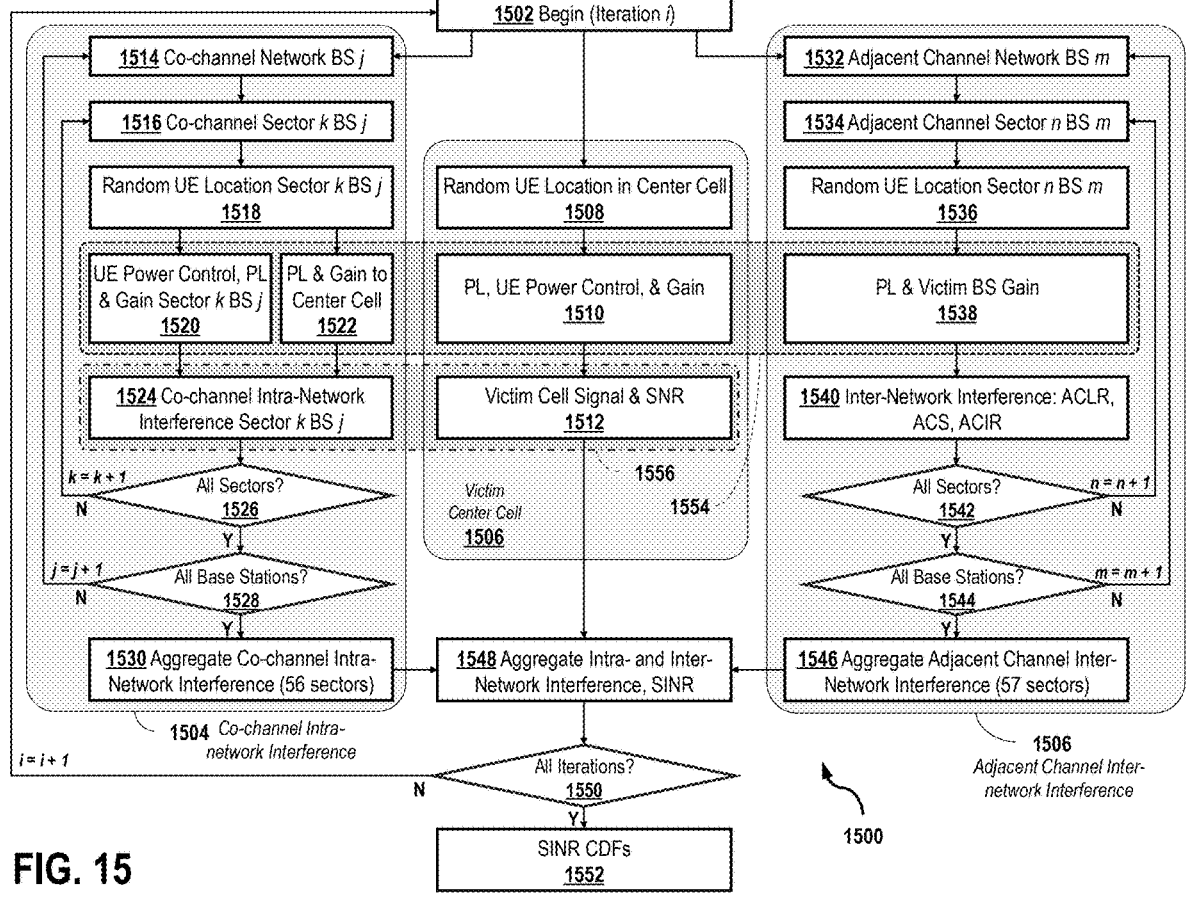

FIG. 15 is a flow diagram depicting an alternative signal-to-interference-and-noise-ratio determination process for adjacent channel networks.

Figure 16:
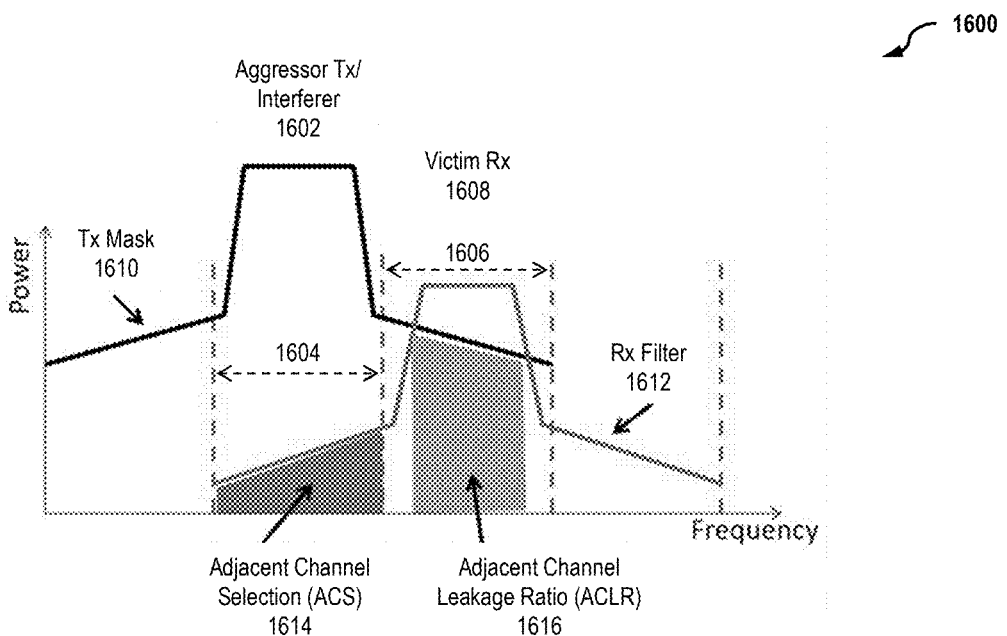

FIG. 16 is a graphical illustration depicting an exemplary signal-to-interference-and-noise-ratio plot for adjacent channels.

Figure 17:
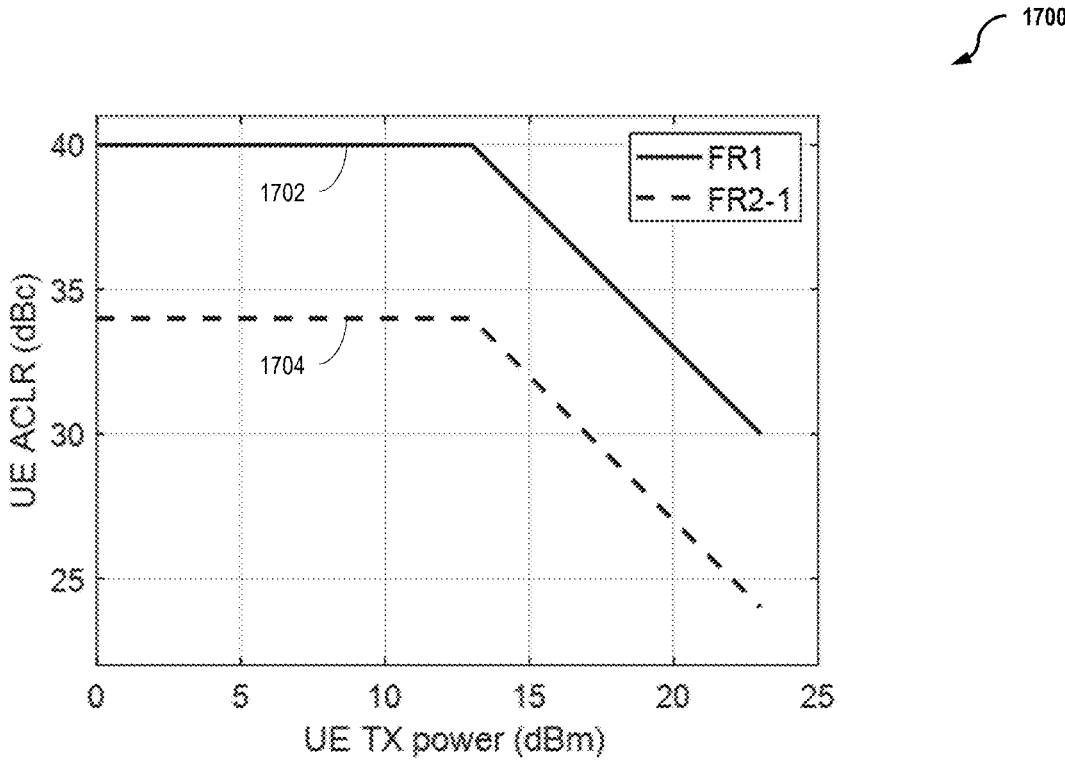

FIG. 17 is a graphical illustration depicting a comparative plot of adjacent channel leakage ratio for an exemplary wireless device, in accordance with an embodiment.

Figure 18A:
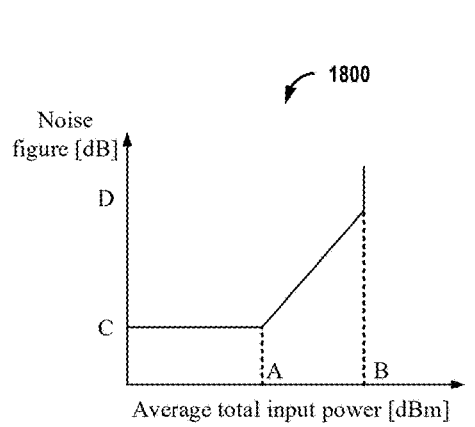

FIG. 18A is a graphical illustration depicting an exemplary noise figure plot for a receiver blocking simulation model, in accordance with an embodiment.

Figure 18B:
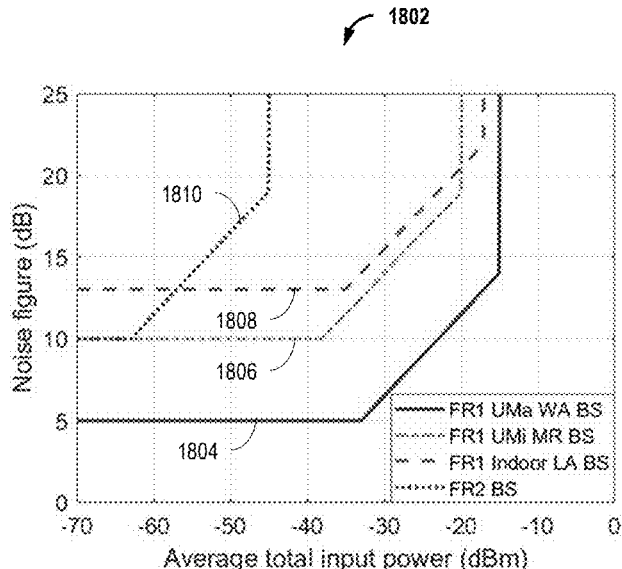

FIG. 18B is a graphical illustration depicting an exemplary comparative impairment plot utilizing the noise figure plot depicted in FIG. 18A.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

As used herein, unless specified to the contrary, "modem termination system," or "MTS" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

The innovative systems and methods described herein provide unique solutions to the challenges described above, as well as the features lacking from previous version releases of 3GPP TR 38.858. These unique solutions have now been acknowledged within the industry by their adoption into the recent release of 3GPP TR 38.858 v18.0 (December 2023), the subject matter of which is incorporated by reference herein. Additionally, unless otherwise described to the contrary herein, element and device terminology, including the respective functionalities thereof, should be considered to have substantially similar structure and/or functionality to components given the same labels in 3GPP TS 36.133 and 38.133, as well as a number of WGA RAN4 R4 submissions from the present inventors, including without limitation, R4-2300143, R4-2300145, R4-2300147, R4-2307056, and R4-2313817, as well as R4-2302888, R4-2305250, R4-2305858, R4-2305921, R4-2305922, R4-2309793, and R4-2316729. The subject matter from all of these additional references is also incorporated by reference herein.

Nevertheless, any term defined differently within the present written description, or which may be provided with additional or different functionality, should be considered to take precedence over the definition of the same term in these other 3GPP TSs, TRs, and/or R4 submissions.

The following embodiments provide unique techniques for simulating adjacent channel UMa-to-UMi coexistence, including frequency range 1 (FR1, e.g., sub-6 GHz), mid-band frequencies, and FR2 (e.g., mmWave frequencies, including 24 MHz through 53 MHz), of non-overlapping SBFD outcomes, the data of which is published in one or more of the R4 submissions incorporated by reference herein. In exemplary embodiments, several configurations are provided for the UMa-to-UMi scenario.

In an exemplary configuration, an analysis considers an SFBD network as a UMa aggressor with respect to a UMi victim legacy TDD network, assuming a 100% grid shift (described further below) between the aggressor and victim networks. In this analysis, the SFBD network is considered for a distributed unit (DU) configuration, and the UMa and UMi utilize the same channel bandwidth (e.g., 100 MHz). A simulation was then conducted by down-selecting one BS antenna configuration for the SBFD network (e.g., power spectral density (PSD) of 48 dBm/80 MHz), and then down-selecting one BS antenna configuration for the UMi BS of the victim TDD network. From this exemplary configuration, SINR and throughput degradation results may be simulated in both the DL and the UL communications.

For an exemplary simulation, the adjacent channel leakage ratio (ACLR, e.g., as defined in 3GPP TS 34.122, incorporated by reference herein) for the BS in FR1 is assumed to be frequency-flat, further considering: (a) if the aggressor BW is narrower than the victim BW (e.g., SBFD gNB and legacy TDD gNB), an equivalent ACLR is deemed equal to a normal ACLR value; and/or (b) if the aggressor BW is wider than the victim BW, the total received interference will be the total transmitted power, $P_{Tx}$, minus the ACLR, plus the ratio of aggressor BW to victim BW. For example, in the case of the aggressor having a 100 MHz BW and the victim having a 20 MHz BW, the equivalent ACLR would be 45+10*log 10(100/20), or 51.9 dB.

In an exemplary embodiment, flat adjacent channel selectivity (ACS) modeling is utilized to simulate FR1 and FR2 in a gNB, further considering: (a) if the aggressor BW is narrower than the victim BW, an equivalent ACS is deemed equal to a normal ACS value; and/or (b) if the aggressor BW is wider than the victim BW, the total received interference will be $P_{Tx}$, minus the ACS, plus the ratio of aggressor BW to victim BW. For example, in the case of a UE ACLR modeled to be 30 dB at maximum power, an improvement of at least 1 dB may be realized, with a backoff improvement of up to 10 dB. Accordingly, for this example, a 10 dB backoff will realize an ACLR of 40 dB.

The embodiments herein describe innovative simulation methodology and deployment scenarios that are particularly advantageous for analysis of the UMa and UMi paradigms discussed above, and for both DL and UL communications. In an exemplary embodiment, the present solutions address key matters that were not addressed or fully addressed in previous releases of 3GPP TR 38.858. The present embodiments thus describe subject matter that has been, after the priority date of the present application, presented to the 3GPP WGA RAN4 and adopted into 3GPP TR 38.858, Release 18. The present embodiments thus provide, for 3GPP TR 38.858, a simulation engine that considers both co-channel interference (CCI) and ACI, and which also evaluates mutual ACI between a legacy TDD network and an SBFD network. In some embodiments, the present simulation techniques may additionally estimate the mutual ACI between two TDD networks.

Network Layout and Topology

Figure 4:
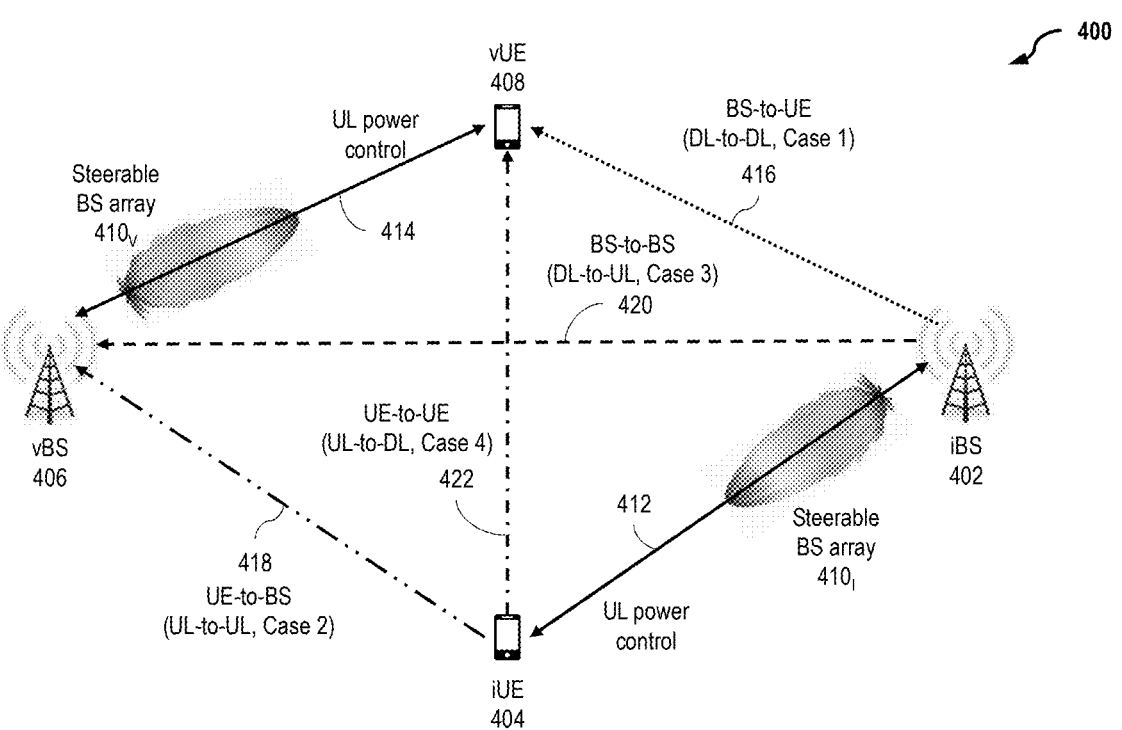
FIG. 4 is a schematic illustration depicting an exemplary multiple communication network topology, in accordance with an embodiment.

FIG. 4 is a schematic illustration depicting an exemplary multiple communication network topology 400. For ease of explanation, network topology 400 is depicted with respect to one interfering base station (iBS) 402 and one interfering communication device (iUE) 404, and one victim base station (vBS) 406 and one victim communication device (vUE) 408. The person of ordinary skill in the art though, will understand that this depiction is provided by way of illustration, and not in a limiting sense. As described further below, the principles of network topology 400 are applicable with respect to interfering (e.g., aggressor) networks and victim networks each including multiple base stations/nodes, and multiple communication devices/UEs.

In the embodiment depicted in FIG. 4, each base station 402, 406 is considered to represent a fixed BS site location. With respect to vBS 406 specifically, vBS 406 may be deemed a central site of the victim network, about which may loop 56 additional base stations in the co-channel network of the victim (described further below). In this example, the adjacent channel of the interfering aggressor network may also include a 57 base station loop. The respective locations of the UEs 404, 408 may be random.

Further to topology 400, each base station 402, 406 may operate in proximity with a steerable BS array $410_I$, $410_V$, respectively, configured such that at least one main beam from each array $410_I$, $410_V$, tracks the random UE location(s) of iUE 404, vUE 408, respectively. In an embodiment, a maximum gain of the main beam(s) may vary with respect to azimuth, elevation, steering angle, etc. Accordingly, iBS 402 may track, e.g., through steerable BS array $410_I$, the random location of iUE 404 along a first communication path 412, and vBS 406 may track, e.g., through steerable BS array $410_V$, the random location of vUE 408 along a second communication path 414.

In this exemplary configuration, topology 400 thus may further include a third communication path 416 between iBS 402 and vUE 408, a fourth communication path 418 between vBS 406 and iUE 404, a fifth communication path 420 between iBS 402 and vBS 406, and a sixth communication path 422 between iUE 404 and vUE 408, for six total potential paths 412 through 422.

In exemplary operation of topology 400, all six communication paths 412 through 422 may be calculated to determine the gain from each BS 402, 406 toward each other BS (e.g., fifth communication path 420), and also toward each UE 404, 408 (e.g., communication paths 412, 414, 416, 418). In an embodiment, the gain from UEs 404, 408 is presumed to be 0 dBi. Line-of-sight (LoS) probability, path loss, shadowing, and outdoor-to-indoor (O2I) loss may then be determined from the relative distance between the respective elements. Cell reselection may then occur within the co-channel network (e.g., vBS 406 and vUE 408). For example, in the case where the victim signal is greater than the signal of a neighboring cell (e.g., −3 dB, not shown in FIG. 4), the location of vUE 408 may be reassigned from one cell to a neighboring cell in the co-channel network.

In an exemplary embodiment, the ACI from an individual aggressor may be evaluated as the signal level arriving at the victim from the aggressor channel, subtracted by the adjacent-channel interference ratio (ACIR). A relationship between the ACIR, unwanted emission adjacent-channel leakage ratio (ACLR), and non-ideal filter adjacent-channel selectivity (ACS) may then be expressed as follows:

$$\frac{1}{\overline{ACIR}} = \frac{1}{\overline{ACLR}} + \frac{1}{\overline{ACS}} \qquad \text{(Eq. 1)}$$

In an exemplary scenario, in the case where the ACLR is 45 dB for iBS 402 and vBS 406 and 30 dB for iUE 404 and vUE 408 and where the ACS is 50 dB for iBS 402 and vBS 406 and 33 dB for iUE 404 and vUE 408, the respective ACIRs may be calculated as follows: (a) the BS-to-UE (e.g., communication paths 412, 414, 416, 418) ACIR is 32.7 dB; (b) the UE-to-BS (e.g., reverse of communication paths 412, 414, 416, 418) ACIR is 35.6 dB; (c) the BS-to-BS (e.g., fifth communication path 420) ACIR is 43.8 dB; and (d) the UE-to-UE (e.g., sixth communication path 422) ACIR is 31.1 dB.

In this example, for ease of explanation, 100 MHz is utilized as the channel bandwidth for each of the victim and aggressor networks, centered at 4 GHZ, and a 100% network load is assumed in both DL and UL (e.g., mimicking a worst-case scenario). UL power control (e.g., first and second communication paths 412, 414) may be implemented using a maximum UE transmitter power of 23 dBm, with a maximum UL SNR of 15 dB. For ease of illustration, the respective UE antennas are assumed to be omnidirectional with 0 dBi gain, and DL power control is not discussed with respect to this example.

Figure 1:
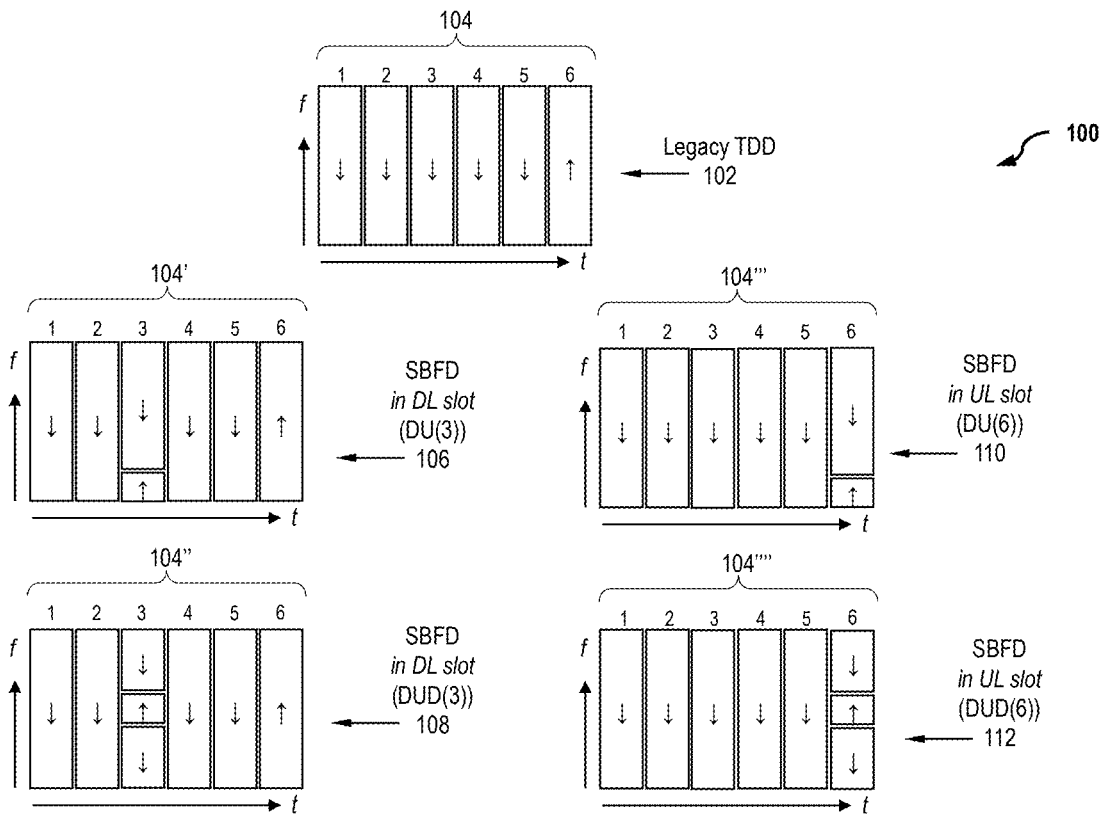
FIG. 1 is a schematic illustration depicting a conventional sub-band full duplex principle.
Figure 2:
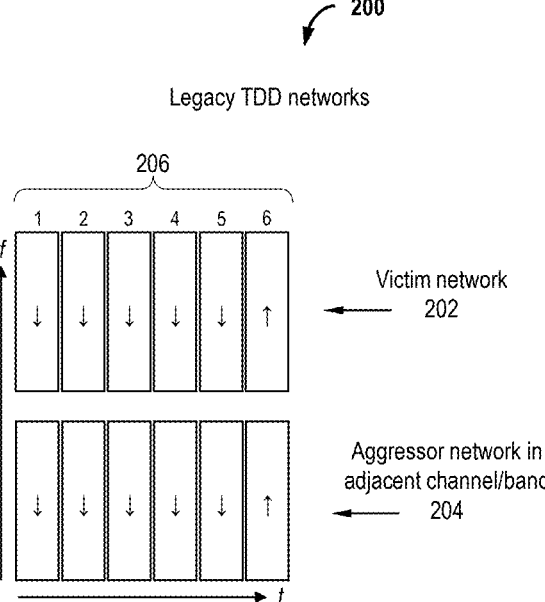
FIG. 2 is a schematic illustration depicting a conventional time division duplex principle.
Figure 3A:
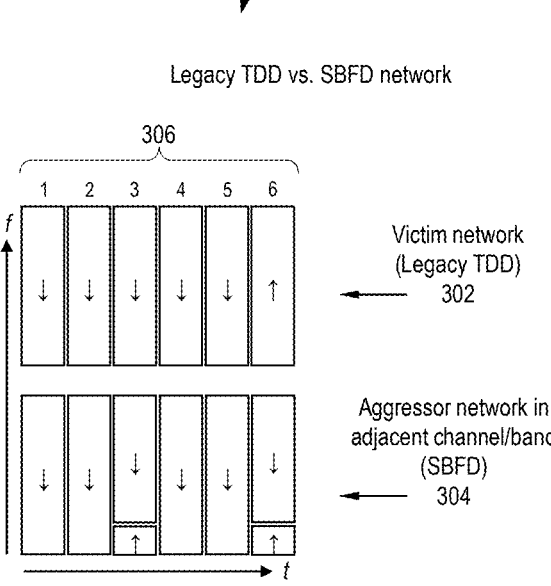
FIG. 3A is a schematic illustration depicting a coexistence challenge effect between a conventional time division duplex network and a conventional sub-band full duplex network.

According to exemplary topology 400, four types of ACI may then be analyzed for the four interference cases described above with respect to FIGS. 2-3B: (1) DL-to-DL (e.g., BS-to-UE, third communication path 416); (2) UL-to-UL (e.g., UE-to-BS, fourth communication path 418); (3) DL-to-UL (e.g., BS-to-BS, fifth communication path 420); and (4) UL-to-DL (e.g., UE-to-UE, sixth communication path 422). As described above, cases (3) and (4) do not present with TDD synchronization, but are relevant to the coexistence schemes described herein. That is, aggregated interference may be analyzed for the victim DL (e.g., vUE 408 as the receiver) in case (1) with TDD synchronization, and in both of cases (1) and (4) without TDD synchronization. Similarly, aggregated interference may be analyzed for the victim UL (e.g., vBS 406 as the receiver) in case (2) with TDD synchronization, and in both of cases (2) and (3) without TDD synchronization. In an embodiment, the analyzed interference may consider both CCI from the same operator, and also ACI from another operator.

In an exemplary embodiment, the SINR may then be converted to throughput using formulae described in 3GPP TR 36.942, which is also incorporated by reference herein. For example, in QPSK, the minimum SINR may be −10 dB, and for a coding rate of 0.125 in DL and 0.2 in UL. Similarly, in QAM, the maximum SINR may be 30 dB for 256-QAM at a 0.93 coding rate in the DL, and 22 dB for 64-QAM at a 0.93 coding rate in the UL. According to exemplary topology 400, not only may the phase 1 priority UMa-to-UMa scenario be analyzed, but also phase 2 scenarios, such as urban-hotspot-to-urban-hotspot, indoor-to-indoor (I2I), and UMa-to-UMi.

UMa-to-UMa

In the urban-macro-to-urban-macro scenario (i.e., UMa-to-UMa), analysis of DL cumulative distribution function (CDF) results are submitted and published in the reference subject matter incorporated herein. The median values (e.g., 50th percentile) of the results represent a cell-center, whereas 5th percentile result values are considered to represent the cell-edge. More particularly, the DL signal may be first considered alone (e.g., without any CCI or ACI), and then together with CCI aggregated from 56 neighbor cells in the same operator's co-channel network, as well as with ACI aggregated from 57 cells in the other operator's adjacent channel network. For BS-to-UE ACI (e.g., third communication path 416, case (1)), TDD synchronization may be assumed between the two networks. For aggregated UE-to-UE ACI (e.g., sixth communication path 122, case (4)), victim network's DL symbol is assumed to overlap with the aggressor network's UL symbol (e.g., in the same time slot). These types of ACI, with or without TDD synchronization, are considered to be significantly smaller than CCI, and thus may have negligible impact on the DL SINR.

In an embodiment, DL throughput improvement may vary in accordance with the size of the respective base station array 410. For example, a large array may lessen the BS-to-UE ACI when two TDD networks are TDD-synchronized. Since the BS-to-UE ACI is significantly less than the CCI, the SINR and throughput improvements with a larger BS array may be more due to a reduction in the CCI.

Similarly, although the UE-to-UE ACI (e.g., sixth communication path 422, case (4), no TDD synchronization) is assumed to have omnidirectional patterns on both ends of the path, a large base station array (e.g., array 410) may somewhat mitigate the UE-to-UE ACI, which is significantly smaller than the CCI, and also the BS-to-UE ACI. Asynchronized TDD networks are considered to exhibit minimal performance degradation because the UE-to-UE interference, which is not present in synchronized TDD networks, is considered to be relatively mild when having a uniform UE location distribution. The performance degradation may be more significant, however, in the case where the UE locations follow a clustered distribution (described further below), for example, where an outdoor base station serves multiple UEs inside a same building or confined location.

UMi-to-UMi

In the UMi-to-UMi scenario, the inter-site distance (ISD) between neighboring cells is significantly smaller than the ISD for the UMa-to-UMa scenario described above (e.g., 289 m, in this example). Nevertheless, the observations for the UMi-to-UMi scenario are relatively similar to the observations for the UMa-to-UMa scenario, and the CCI may be sign significantly mitigated by large base station arrays having narrow beams that reject mutual interference in the spatial domain. Because large base station arrays further improve the SINR and throughput, the BS-to-UE ACI may also be improved when aggregated with CCI. The UE-to-UE ACI (e.g., in the case without TDD synchronization) may be considered fairly negligible with a uniform distribution of UE locations. It be noted that the DL throughput improvement from the array size is expected to be slightly smaller in the UMi-to-UMi scenario, relative to the UMa-to-UMa scenario, due to the respectively smaller ISD between, and area of, UMi cells having better coverage than UMa cells.

For ease of explanation, several of the following embodiments are described with respect to the UMa-UMi scenario. The person of ordinary skill in the art will understand that this focus is for illustrative purposes, and is not intended to be limiting. Several of the innovative principles herein may be advantageously applicable to the other scenarios described above, and without departing from the scope herein.

FIG. 5A is a graphical illustration depicting an inter-site distribution scheme 500 for a plurality of cellular sites 502 (depicted as black triangles in FIG. 5A). In the exemplary embodiment depicted in FIG. 5A, 19 individual cellular sites 502 are illustrated, and each cellular site 502 is separated from an adjacent, neighboring cellular site 502 by an inter-site distance (ISD) (e.g., shown in FIG. 5A between a first cellular site 502(1) and a second cellular site 502(2)). In an exemplary embodiment, first cellular site 502(1) is assigned as a center site of distribution scheme 500, and the other co-channel cellular sites 502 are numbered along outward progressing rings about first cellular site 502(1), such that a first site ring 504 is formed of second through seventh cellular sites 502(2-7), numbered clockwise starting east-ward from first cellular site 502(1).

Each cellular site 502 within first ring 504 is thus separated both from first cellular site 502(1), and also from an immediately-adjacent cellular site 502 within first ring 504, by the ISD. A second site ring 506 is formed about first site ring 504, and includes eighth through nineteenth cellular sites 502(8-19). Second site ring 506 is thus naturally larger than first site ring 504, and each cellular site 502 within second ring 506 is separated, by the ISD, from at least one cellular site 502 of first ring 504 (e.g., cellular sites 502(2-7)), and also from at least one immediately-adjacent cellular site 502 within second ring 504, also by the ISD.

FIG. 5B is a graphical illustration depicting a sector topology 508 for inter-site distribution scheme 500, FIG. 5A. According to topology 508, each cellular site 502 is the center of three adjoining hexagonal sectors 510. That is, three sectors are distributed about each cellular site 502 (120° in azimuth), where each sector 510 covers a hexagonal area. In an exemplary embodiment, sectors 510 are num-bered rotationally, in order of the respective cellular site 502 about which the corresponding sectors are distributed. For example, first cellular site 502(1) becomes the center of sectors 510(1-3) (e.g., rotating clockwise about each cellular site 502), second cellular site 502(2) becomes the center of sectors 510(4-6), third cellular site 502(3) becomes the center of sectors 510(7-9), etc.

Accordingly, for 19 cellular sites 502, 57 sectors 510 are distributed about sector topology 508 (shown in greater detail in FIG. 10A, below). In the exemplary embodiment, each cellular site has a radius R that is one third of the ISD. Therefore, for an ISD of 200 m (e.g., UMi), the cell radius R would be 200/3 m, or approximately 67 m.

Figures 6A, 6B, 6C:
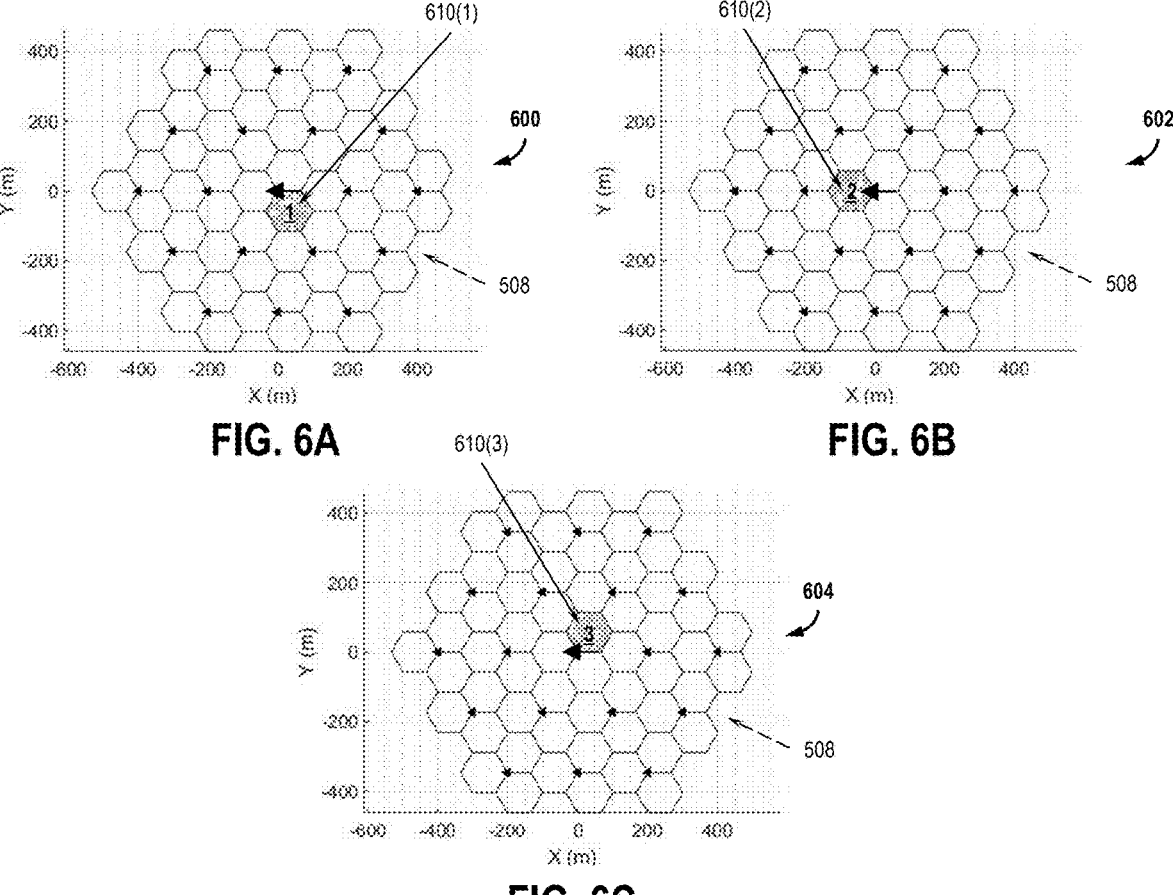

FIGS. 6A-E are graphical illustrations depicting UE deployments 600, 602, 604, 606, 608, respectively, for sector topology 508, FIG. 5B. In an exemplary embodiment, the evaluation methodology of the present embodiments will generate a plurality of random UE locations 610 for each sector 510 about an individual cellular site 502. More specifically, FIG. 6A depicts an exemplary UE deployment 600 of a plurality of UEs 610(1) (200 UEs, in this example) within sector 510(1) about cellular site 502(1), FIG. 6B depicts an exemplary UE deployment 602 of a plurality of UEs 610(2) within sector 510(2) about cellular site 502(1), and FIG. 6C depicts an exemplary UE deployment 604 of a plurality of UEs 610(3) within sector 510(3) about cellular site 502(1). FIG. 6D illustrates a combined deployment 606 of all sectors 510(1-3) about cellular site 502(1), including pluralities of UEs 610(1-3). FIG. 6E illustrates an exemplary UE deployment 608 of UEs for all 57 sectors 510 of sector topology 508. Accordingly, in the case of 200 random UEs generated for each sector 510, UE deployment 608 illus-trates 11,400 random UEs generated for sector topology 508.

Clustered UE Distribution

FIG. 7A is a graphical illustration depicting a distribution 700 of clustered devices within sector 510(1) of sector topology 508, FIG. 5B. In an exemplary embodiment, the innovative systems and methods of the present application establish a plurality of device clusters 702 within each sector

510 of sector topology 508. FIG. 7A depicts, for illustrative purposes, and not in a limiting sense, distribution 700 for a single sector 510. The person of ordinary skill in the art will understand that additional distributions 700 may be estab-lished for each sector 510 of sector topology 508 without departing from the scope herein. In the exemplary embodi-ment depicted in FIG. 7A, distribution 700 establishes 15 device clusters 702 within sector 510(1).

FIG. 7B is a close-up view of sector 510(1), FIG. 7A. As may be seen from FIG. 7B, each of the 15 device clusters 702 includes a cluster center 704 having a cluster radius r from cluster center 704 to the outer edge of that respective cluster. In an exemplary embodiment, the present evaluation techniques may be further configured to distribute the 15 respective cluster centers 704 uniformly within sector 510 (1) such that no device cluster 702 crosses a boundary of the respective hexagonal sector 510. In an embodiment, device clusters 702 may be further distributed such that each cluster center 704 is spaced from the respective cellular site 502 (cellular site 502(1), in this example) at a minimum distance greater than the cluster radius r. For example, given a cluster radius r of 25 m, the minimum distance between the base station of the respective cellular site 502 and a cluster center 704 may be 25 m+35 m (e.g., UMa), or 60 m.

FIG. 7C is a graphical illustration depicting a distribution 706 of clustered devices within sector 510(1)' of sector topology 508, FIG. 5B. In an exemplary embodiment, distribution 706 is similar to distribution 700, FIG. 7A, except that distribution 706 includes 1000 device clusters 702' within sector 510(1)'. FIG. 7D is a close-up view of sector 510(1)', FIG. 7C. In some embodiments, distribution 706 may be configured such that multiple device clusters 702' do not overlap within the respective sector 510'. For example, in the case of a cluster radius r of 25 m, a minimum distance between two cluster centers 704' may be configured to be 50 m. In other embodiments, distribution 706 may be configured such that one or more device clusters 702' having different cluster centers 704' partially overlap.

FIG. 8A is a graphical illustration depicting an exemplary clustered device distribution 800 among adjacent channels according to sector topology 508, FIG. 5B. Clustered device distribution 800 is similar to distribution 700, FIG. 7A, except that clustered device distribution 800 illustrates a plurality of device clusters 802 with in the first sector 510(1) of co-channel sector topology 508 with respect to an over-lapping adjacent channel sector topology 804.

In the exemplary embodiment depicted in FIG. 8A, adja-cent channel sector topology 804 has a substantially simi-larly hexagonal sector configuration as co-channel sector topology 508, namely, 57 hexagonal adjacent channel sec-tors 806 about 19 adjacent cellular sites 808, with each adjacent channel sector 806 having the same radius R as sectors 510 of co-channel topology 508. In this example, for purposes of illustration and not in a limiting sense, clustered device distribution 800 is depicted as including 12 device clusters 802 with in first sector 510(1), and a 50% grid offset between co-channel sector topology 508 and adjacent chan-nel sector topology 804, e.g., from first cellular site 502(1) (co-channel) to first adjacent channel cellular site 808(1).

FIG. 8B is a close-up view of sector 510(1), FIG. 8A. As may be seen from FIG. 8B, each of the 12 device clusters 802 have substantially the same cluster spacing and mini-mum distance-from-site requirements as device clusters 702, FIG. 7B, and also do not cross the hexagonal boundary of first sector 510(1). Different though, from distribution 700, the present evaluation techniques may be further configured such that none of the 12 device clusters cross a boundary of adjacent channel sector 806(1) that falls within the area of first sector 510(1). In the exemplary embodiment depicted in FIG. 8B, six device clusters 802 fall within the area of first sector 510(1), but outside the area of adjacent channel sector 806(1) contained within the area of first sector 510(1) (e.g., shaded region in FIG. 8B).

FIG. 8C is a graphical illustration depicting an alternative clustered device distribution 810 among adjacent channels according to sector topology 508, FIG. 5B. In an exemplary embodiment, distribution 810 is similar to distribution 800, FIG. 8A, and includes 12 distributed device clusters 802' in first sector 510(1)', where first sector 510(1)' partially overlaps with first adjacent channel sector 806(1)', except that, in this example, adjacent channel sector topology 804' exhibits only a 25% grid offset with respect to co-channel sector topology 508.

FIG. 8D is a close-up view of 510(1)', FIG. 8C. As may be seen from FIG. 8D, each of the 12 device clusters 802' are configured to conform to the same cluster spacing, minimum distance requirements, no-boundary crossing guidelines as clustered device distribution 800, FIGS. 8A-B. It may be noted from the illustrated example of FIG. 8D though, by having a smaller grid offset, many more of the twelve device clusters 802' fall within the overlapping region (e.g., shaded region in FIG. 8D) than for the 50% grid offset example depicted in FIGS. 8A-B. For example, only two of device clusters 802' fall outside of the overlapping region, whereas now 10 of the 12 device clusters 802' fall within the overlapping region.

FIG. 9A is a graphical illustration depicting an exemplary victim device distribution 900 within sector 510(1), FIGS. 5B, 8A. That is, similar to clustered device distribution 800, FIG. 8A, the present embodiments may also be configured to generate a plurality of random victim device (e.g., UE) locations 902 for each sector 510. In the exemplary embodiment depicted in FIG. 9A, random device locations 902 (e.g., 1000 victim UE locations 902, in this example) are illustrated within first sector 510(1), FIG. 5B, with respect to the 50% grid offset scenario depicted in FIG. 8A for co-channel sector topology 508 and adjacent channel sector topology 804. In an embodiment, the present techniques may be configured to generate random victim device locations 902 separately from, or in accordance with, generation of device clusters 802, FIG. 8A. In some embodiments, random victim device locations 902 may be generated after device clusters 802. In other embodiments, random victim device locations 902 may be generated before, or simultaneously with, the generation of device clusters 802.

FIG. 9B is a close-up view of sector 510(1), FIG. 9A. In the exemplary embodiment depicted in FIG. 9B, random victim device locations 902 are illustrated with respect to two exemplary scenarios: (a) outdoor UEs; and (b) indoor UEs. For example, in the case where random victim device locations 902 are generated for outdoor UEs (e.g., approximately 20% of random victim device locations 902 depicted in FIG. 9B), the present techniques may be further configured to uniformly distribute such outdoor random victim device locations 902 throughout the hexagonal sector 510. In the case where random victim device locations 902 are generated for indoor UEs (e.g., approximately 80% of random victim device locations 902 depicted in FIG. 9B), such indoor random victim device locations 902 may be distributed uniformly within an individual device cluster 802. In this example, it is presumed that the particular device cluster 802 is generated prior to, or at least simultaneously with, the generation of indoor random victim device locations 902.

FIG. 9C is a graphical illustration depicting an alternative victim device distribution 904 within sector 510(1)', FIGS. 5B, 8C. Victim device distribution 904 is similar to victim device distribution 900, FIG. 9A, except that victim device distribution 904 is depicted for an exemplary case scenario of 100 generated victim device/UE locations 902', and with respect to a 25% grid offset from co-channel sector topology 508 to adjacent channel sector topology 804'. FIG. 9D is a close-up view of sector 510(1)', FIG. 9C, which is similar to the close-up view of sector 510(1), FIG. 9B, except for different numbers for the generated victim device/UE locations 902' and grid offset percentage.

FIG. 10A is a graphical illustration depicting an exemplary aggressor device distribution 1000 within sector 510(1), FIGS. 5B, 8A, 9A. In an exemplary embodiment, the present techniques may be configured to generate aggressor device distribution after generation of clustered device distribution 800, FIG. 8A, and victim device distribution 900, FIG. 9. For example, after generating plurality of device clusters 802, FIG. 8A, and plurality of victim UE locations 902, FIG. 9A, a processor of an evaluation device (e.g., hub, MTS, modem, etc., not shown in FIG. 10A) may generate a plurality of random aggressor device/UE locations 1002 about a particular cellular site 502 (first cellular site 502(1), in this example).

In the exemplary embodiment depicted in FIG. 10A, aggressor device distribution 1000 is depicted for an exemplary case scenario of 100 generated aggressor device/UE locations 902', and with respect to a 50% grid offset from co-channel sector topology 508 to adjacent channel sector topology 804'. FIG. 10B is a close-up view of sector 510(1), FIGS. 5B, 10A, depicting, for example, a plurality of outdoor (e.g., 20%) aggressor device UE locations 1002 uniformly distributed about hexagonal sectors 510, 806, as well as a plurality of indoor (e.g., 80%) aggressor device/UE locations uniformly distributed within a particular device cluster 802 within first co-channel sector 510(1).

FIG. 10C is a graphical illustration depicting an alternative aggressor device distribution 1004 within sector 510(1)', FIGS. 5B, 8C, 9C. Aggressor device distribution 1004 is similar to aggressor device distribution 1000, FIG. 10A, except that aggressor device distribution 1004 is depicted for an exemplary case scenario of 1000 generated aggressor device/UE locations 1002', and with respect to a 25% grid offset from co-channel sector topology 508 to adjacent channel sector topology 804'. FIG. 10D is a close-up view of sector 510(1)', FIG. 10C, which is similar to the close-up view of sector 510(1), FIG. 10B, except for different numbers for the generated victim device/UE locations 1002' and grid offset percentage.

FIG. 11 is a flow diagram depicting an exemplary device distribution process 1100 for sector 510(1), FIGS. 5B, 8A-10D. In an exemplary embodiment, process 1100 is executed among and with respect to a plurality of co-channel cellular sites 502 of co-channel sector topology 508, FIG. 5A, and a plurality of adjacent channel cellular sites 808 of adjacent channel sector topology 804, FIG. 8A. In an exemplary embodiment, process 1100 may be executed by a processor (not shown in FIG. 11) disposed at or proximate to one or more base stations associated with a cellular site 502. Process 1100 to be executed by a processor disposed within a central office or a communications hub of a network operator in communication with the plurality of cellular sites 502. Unless described below to the contrary, one or more of the several steps, subprocesses, and/or subroutines of device distribution process 1100 may be performed in a different order, and/or two or more of the several steps/subprocesses/ subroutines may be performed simultaneously.

In exemplary operation, process 1100 begins at step 1102, in which a plurality of clusters centers or uniformly distributed within a hexagonal sector of the co-channel sector topology. In an exemplary embodiment, step 1102 may be executed in a manner similar to that described above with respect to distribution 700 of cluster centers 704, FIG. 7A, for co-channel sector topology 508, and at a minimum distance between the base station of the particular cellular site 502 (e.g., 35 m for UMa) and the corresponding device cluster 702 of that cluster center 704 (e.g., a device cluster 702 having a radius r from the corresponding cluster center 702). In step 1104, process 1100 determines that the device clusters corresponding to the distributed cluster centers (e.g., from step 1102) do not overlap within the single hexagonal sector. In an exemplary embodiment, step 1104 may also be executed in a manner similar to that described above with respect to distribution 700 of device clusters 702, FIG. 7A, and such that a minimum distance between two cluster centers 704 within a single sector 510 are spaced from one another at a minimum distance of at least 2r (e.g., 50 m, in this example).

In step 1106, process 1100 verifies that the generated and distributed device clusters do not individually cross sectors of the adjacent channel network that overlap one or more sectors of the evaluated co-channel sector network. In an exemplary embodiment, step 1106 may be executed in a manner similar to that described above with respect to cluster to device distribution 800, FIG. 8A. In the case of a 100% grid offset between co-channel sector topology 508 and adjacent channel sector topology 804, step 1106 may become optional.

In step 1108, process 1100 generates victim device (e.g., co-channel UE) locations within one or more sectors 510 of co-channel sector topology 508. In an exemplary embodiment, step 1108 may be executed in a manner similar to that described above with respect to victim device distribution 900, FIG. 9A, and randomly generate a plurality of victim UE locations 902 uniformly throughout each particular sector 510 (e.g., in the case of outdoor UEs), and/or uniformly within an individual device cluster 802 within that particular sector 510 (e.g., in the case of indoor UEs).

In step 1110, process 1100 generates aggressor device (e.g., adjacent channel UE) locations about a particular cellular site 502 such that at least some of the aggressor UE locations are distributed with in a particular sector 510 of co-channel sector topology 508. In an exemplary embodiment, step 1110 may be executed in a manner similar to that described above with respect to aggressor device distribution 1000, FIG. 10A. In an exemplary embodiment of step 1110, process one thousand may be further configured to randomly generate a plurality of aggressor UE locations 1002 uniformly throughout each particular sector 510 (e.g., in the case of outdoor UEs), and/or uniformly within an individual device cluster 802 within that particular sector 510 (e.g., in the case of indoor UEs).

According to process 1100, innovative new techniques for analyzing and simulating ACI and ACIR for both the urban macro and the urban micro deployments are provided. As described further below with respect to FIGS. 12A-13B, the systems and methods described above may be further implemented with respect to an aggressor network having a significantly larger topology area than the co-channel victim network.

18

Grid Shift

Figure 12A:
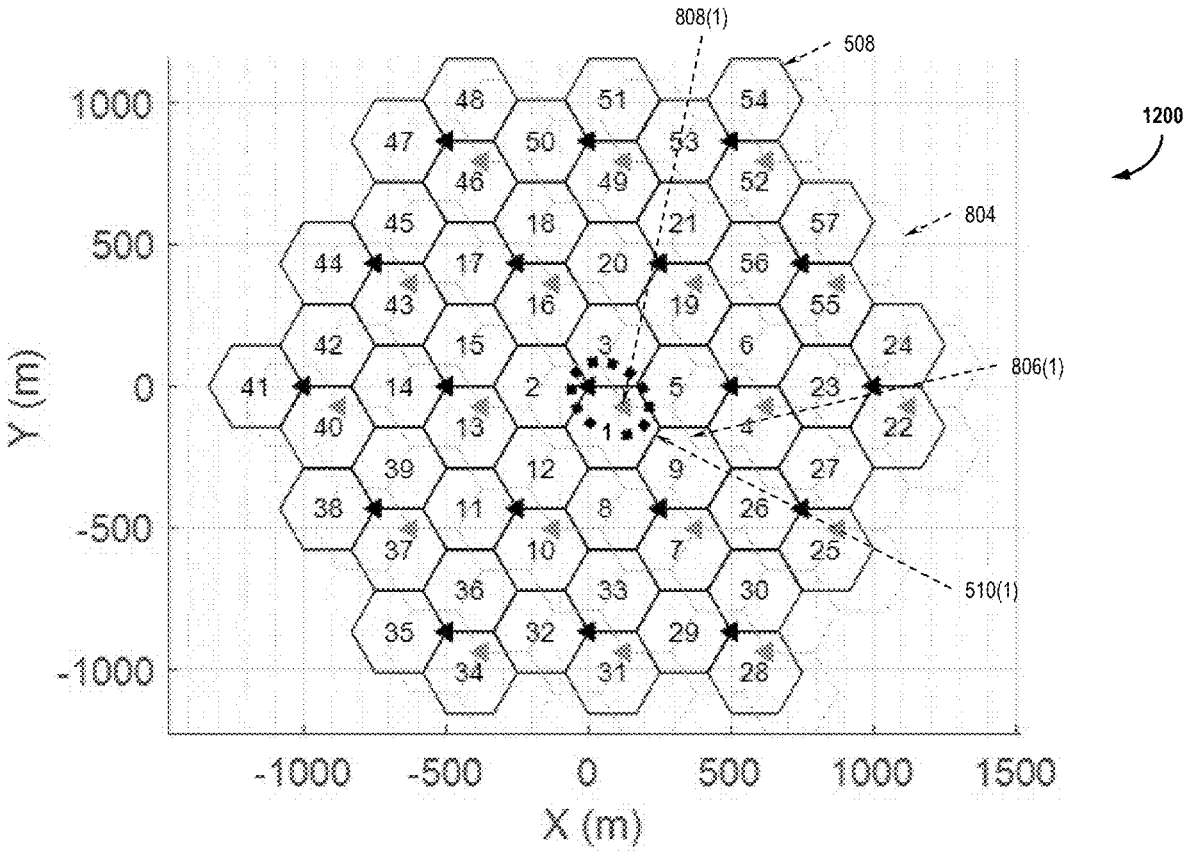
Figure 12B:
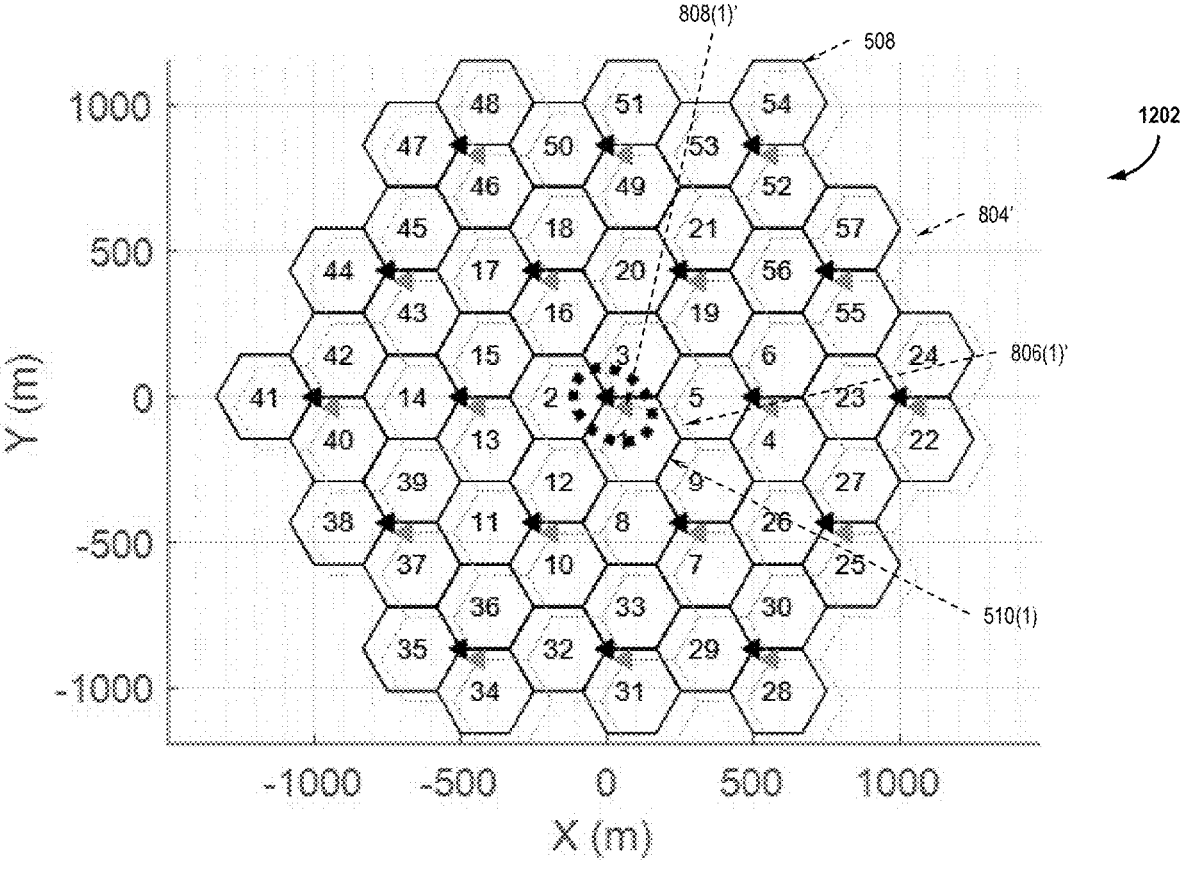
Figure 12C:
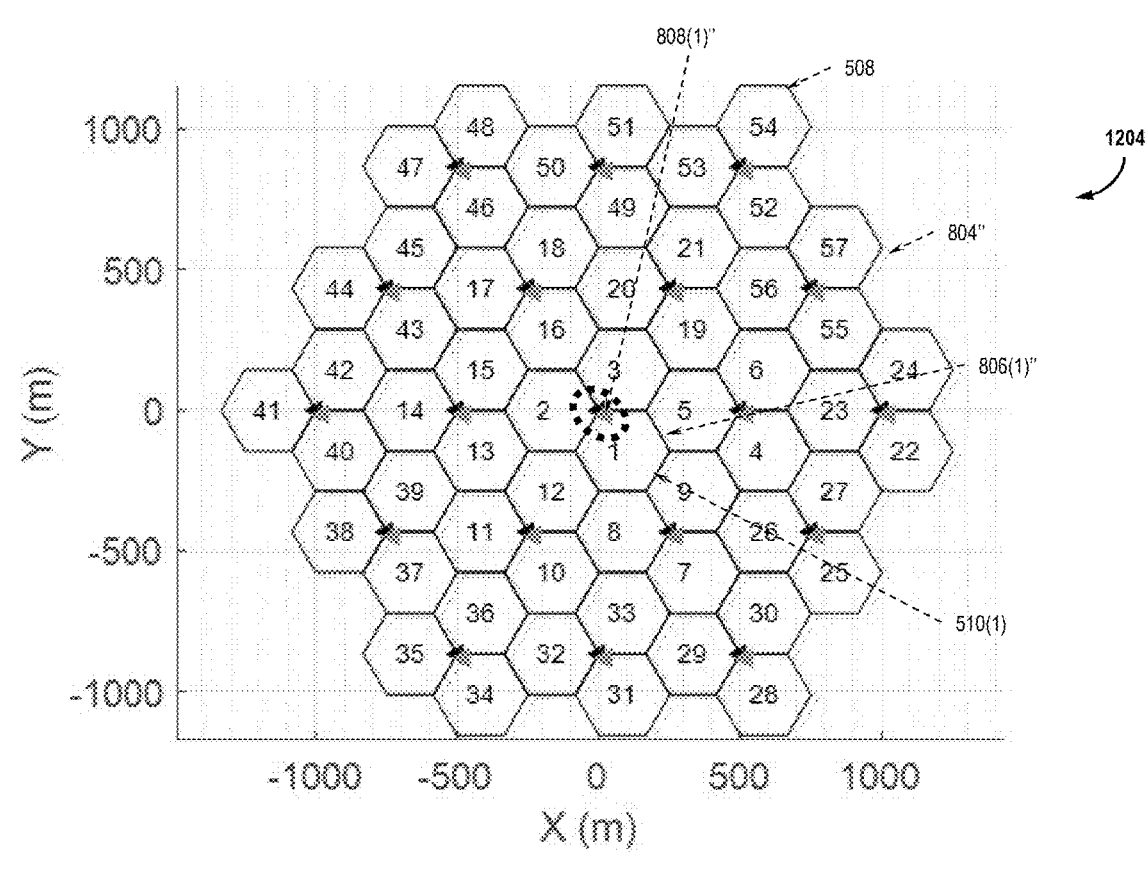
Figure 12D:
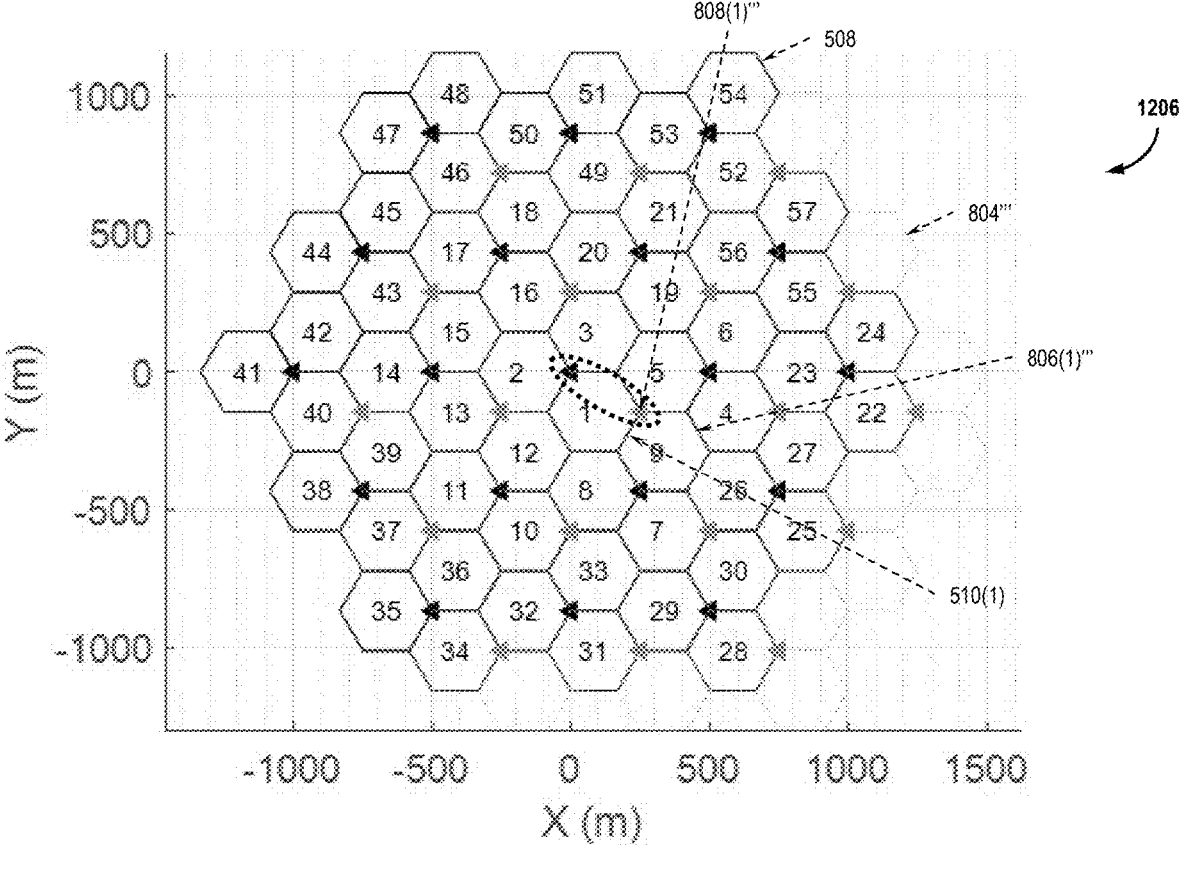
Figure 13A:
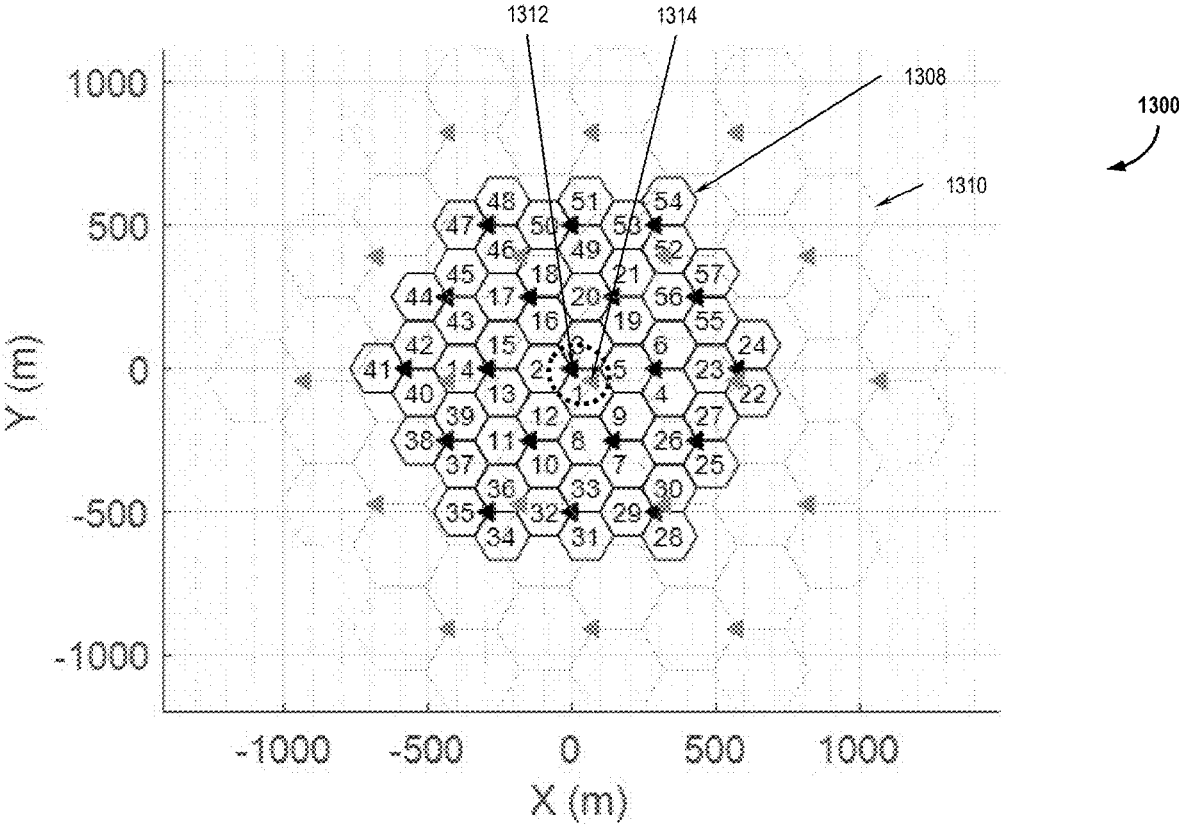
Figure 13B:
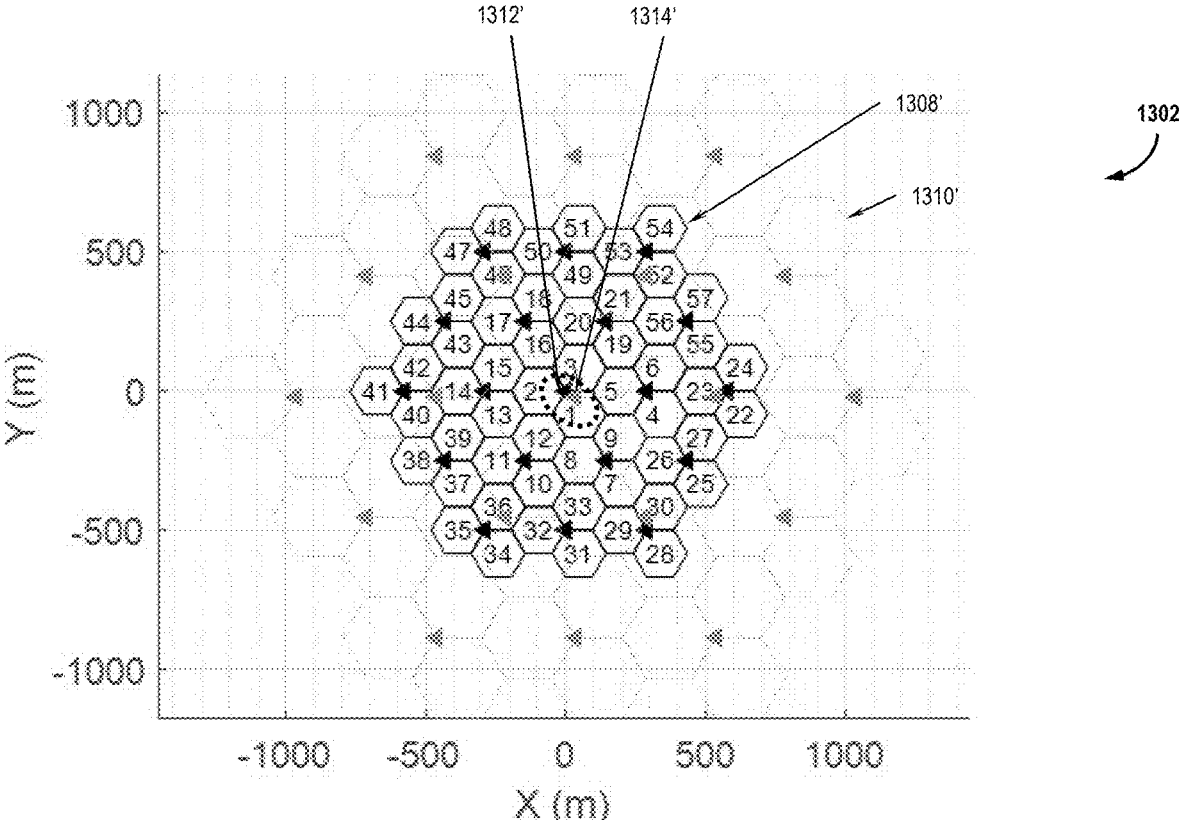
Figure 13C:
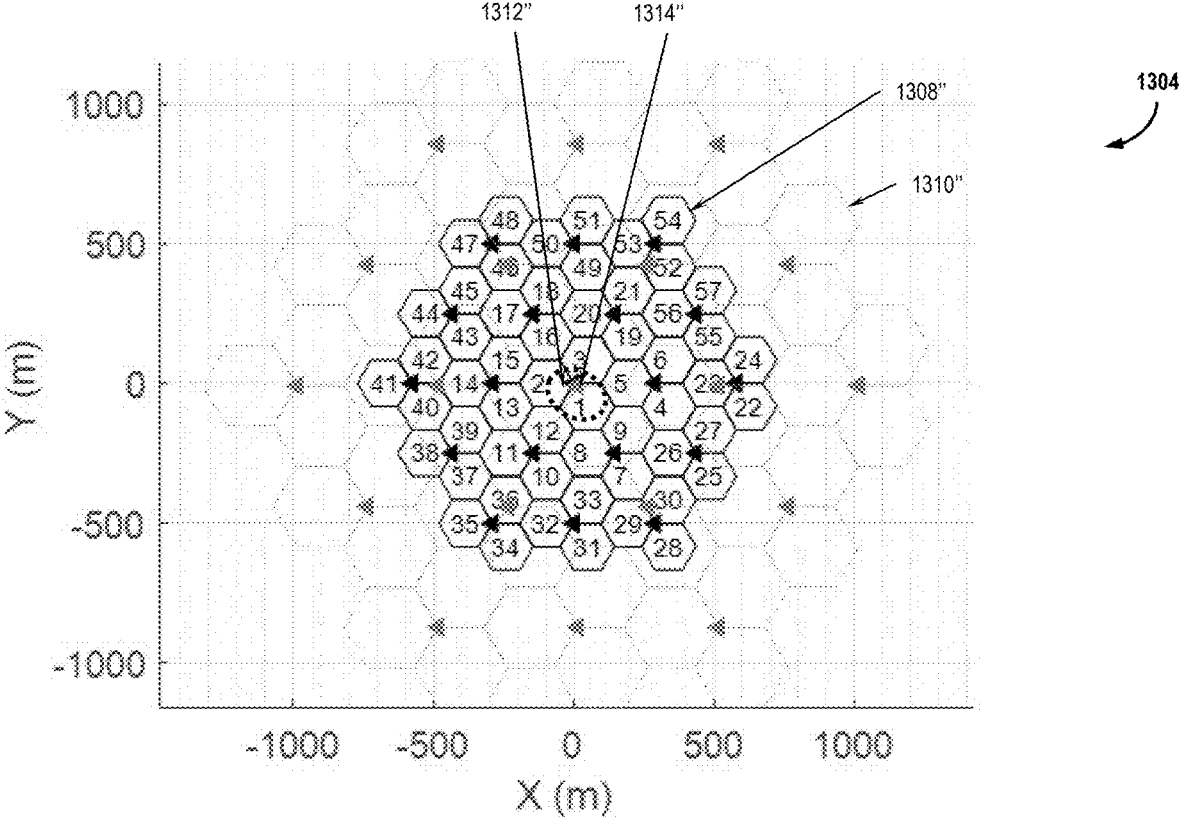
Figure 13D:
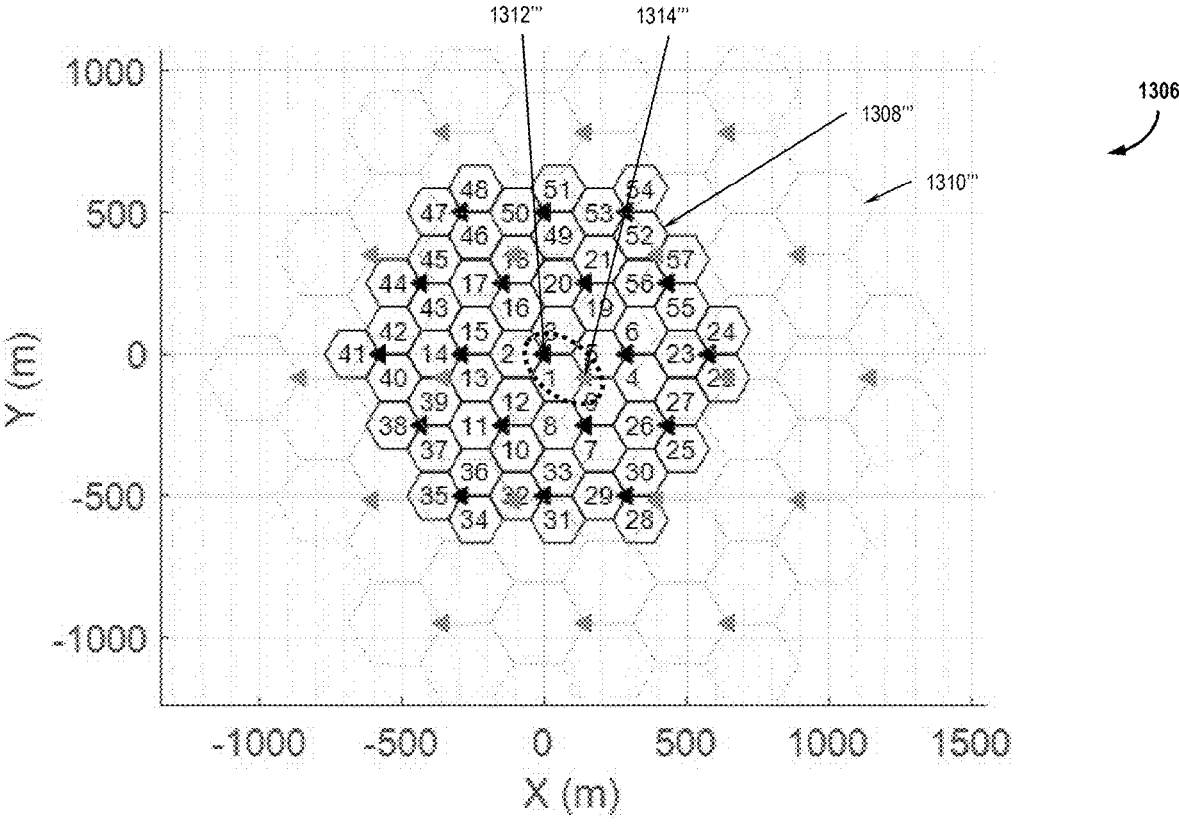

FIGS. 12A-D are graphical illustrations depicting exemplary grid shift effects 1200, 1202, 1204, 1206, respectively, with respect to co-channel sector topology 508, FIG. 5A, and adjacent channel sector topology 804, FIG. 8A (e.g., same ISD between network topologies, with 19 cellular sites and 57 sectors each). More particularly, FIG. 12A depicts grid shift effect 1200 with respect to a 50% grid shift between sector topologies 508, 804. In a similar manner, FIG. 12B depicts grid shift effect 1202 with respect to a 25% grid shift, FIG. 12C depicts grid shift effect 1204 with respect to a 10% grid shift, and FIG. 12D depicts grid shift effect 1206 with respect to a 100% grid shift.

In an exemplary embodiment, grid shift effects 1200-1206 are representative of a UMa-to-UMa scenario having, for example, a 500 m ISD per sector. In an alternative embodiment, grid shift effects 1200-1206 are representative of a UMi-to-UMi scenario having, for example, a 289 m ISD per sector (e.g., based on a UMa-to-UMi coverage area ratio of 3). In the exemplary embodiments depicted in FIGS. 12A-D, first sector 502(1) represents the victim cell, with the other 56 sectors 502(2-57) being co-channel thereto (e.g., frequency reuse 1, FR-1). In this exemplary scenario, the victim cell may generate CCI. Accordingly, when both sector topologies 508, 804 have the same ISD, the respective hexagonal sectors 510, 806 will overlap consistently from sector to sector, and gNB-to-gNB distance between the two networks may be maximized while minimizing the gNB-to-gNB ACI.

In the exemplary embodiments depicted in FIGS. 12A-D, the aggressor adjacent channel sector topology 804 may use the same channel adjacent to the victim channel of co-channel sector topology 508 without any guard band. In an embodiment, aggressor adjacent channel sector topology 804 may represent an interfering network of a different operator in an adjacent channel. For grid shift effects 1200-1206, the aggressor/interfering site (e.g., site 808(1)) seats in the center of three victim sites (e.g., sites 502(1-3)), which maximizes the aggressor site/BS-to-victim site/BS distance, while minimizing the BS-to-BS interference. Accordingly, the aggressor BS grid topology (e.g., adjacent channel sector topology 804) shifts x %, where x is a value between 0 and 100.

Accordingly, for the present simulation evaluation processes, all 19 aggressor sites 808 are shifted by x % in meters from the closest victim site 502 (e.g., dashed circles in FIGS. 12A-D), that is, in the exemplary scenario where both victim and aggressor topologies share the same ISD. For example, in the case of a 10% grid shift (e.g., grid shift effect 1204, FIG. 12C), for an ISD of 289 m, all 19 aggressor sites 808 would be shifted approximately 29 m away from the closest respective victim site 502 (e.g., FR1 UMa-to-UMa). Alternatively, for a UMi-to-UMi scenario, the respective grid offset distance may be 83 m for a 50% grid offset (e.g., FIG. 12A), 42 m for a 25% grid offset (e.g., FIG. 12B), 17 m for a 10% grid offset (e.g., FIG. 12C), and 167 m for a 100% grid offset (e.g., FIG. 12D).

In an exemplary embodiment, the height of a site base station may be 25 m above ground for UMa, and 10 m above ground for UMi. For the simulation methodologies described herein, the height of a UE is assumed to be approximately 1.5 m above ground. In one exemplary simulation, one million iterations were run for each case scenario depicted in FIGS. 12A-D. For each iteration, one UE was assigned in each cell sector, assuming a uniform distribution therein (e.g., random victim device locations 902, FIG. 9A), and an 80% probability that the UE was outdoor and a 20% probability that the UE was indoor. For this simulation, it was assumed that all site base stations were outdoors, and an outdoor-to-indoor (O2I) loss was considered for indoor UEs. Between a base station and a UE, the 3GPP (e.g., 3GPP TRs 38.803 and 38.901, incorporated by reference herein) UMa and UMi path loss models were used with a random line-of-sight (LOS) probability, and the UMa path loss model was employed for BS-to-BS paths (i.e., 25 m height for UMa, 10 m for UMi). For UE-to-UE paths, the UMi path loss model was applied for two-dimensional distances less than 10 m, and free space path loss used for greater distances.

UMa-to-UMi SBFD-to-TDD Coexistence Results (FR1)

In one effective simulation, coexistence between a legacy TDD UMi network and an SBFD UMa network were evaluated according to the RAN4 simulation assumptions described above and incorporated by reference herein. For example, for the UMi network, a medium range base station having a 10 dB noise figure, a minimum BS-to-UE distance of 5 m, and a 2×2 antenna array with a maximum gain of 11 dBi was simulated. For the UMa network, the simulated SBFD base station included two 2×2 antenna arrays for simultaneous UL reception and DL transmission. Additionally, the simulated results were based on a conducted base station transmission power of 46 dBm over a 100 MHz channel bandwidth, which derived an EIRP of 57 dBm/100 MHz, or 47 dBm/10 MHz equivalent meeting the FCC EIRP limit for a CBRS band Cat-B base station. The base station ACS for both macrocells and microcells was updated to 50 dBc.

For the simulated evaluations the FR1 UMa-to-UMi grid shift scenario was analyzed for the several grid offset percentages respectively depicted in FIGS. 12A-D for a 289 m ISD. In these simulations, it was confirmed that since the 100% grid shift (e.g., FIG. 12D) maximized the BS-to-BS distance between two adjacent-channel networks, a 100% grid offset demonstrated a best case scenario to minimize the BS-to-BS ACI, whereas the BS-to-BS ACI increased with each decrease in the grid offset percentage. In contrast, the simulation results demonstrated that the SINR and through-put degradation was greater at a 50% grid shift (e.g., FIG. 12A) that what was seen from results of both larger grid shifts (e.g., 100%, FIG. 12D) and smaller grid shifts (e.g., 25% and 10%, FIGS. 12B and 12C, respectively).

Accordingly, the results demonstrated that the TDD UL throughput degradation does not always increase when the BS-to-BS distance (i.e., grid shift) was reduced, at least in part due to the different respective heights of macrocell and microcell base stations. Additionally, the relative elevation angle changes when the BS-to-BS distance is reduced, thereby moving the interference path away from or out of the main beam from the base station, thus reducing the BS-to-BS interference. In some results, a 46% grid shift demonstrated an optimal balance between BS-to-BS path loss and antenna gain, and at which SINR and throughput degradation were maximized.

FIGS. 13A-D are graphical illustrations depicting alternative grid shift effects 1300, 1302, 1304, 1306, respectively, with respect to a victim network topology 1308 and an interfering aggressor network topology 1310. Grid shift effects 1300-1306 are similar to grid shift effects 1200-1206, FIGS. 12A-D, respectively, except that for grid shift effects 1300-1306, topologies 1308, 1310 have different respective ISDs. That is, in the exemplary embodiments depicted in FIGS. 13A-D, aggressor network topology 1310 is illustrated as having a significantly larger ISD than victim network topology 1308, that is, the individual sector hexagonal area of interfering aggressor network topology 1310 is larger than the individual hexagonal area of victim network topology 1308.

Accordingly, different from grid shift effects 1200-1206, FIGS. 12A-D, which shifted the entire interfering grid topology with respect to the victim grid topology, for grid shift effects 1300-1306, the grid offset of between victim network topology 1308 and aggressor network topology 1310 is based only on the distance between a center cellular site 1312 of victim network topology 1308 (i.e., the victim cell) and a nearby interfering site 1314 of aggressor network topology 1310. That is, for two adjacent networks having different ISDs, the x % of grid offset is determined relative to the smaller ISD of the two networks. Given this alternative determination of grid offset, grid shift effects 1300-1306 generally correspond to the exemplary case scenarios depicted in FIGS. 12A-D, respectively. That is, grid shift effect 1300 (FIG. 13A) represents a 50% grid offset, grid shift effect 1302 (FIG. 13B) represents a 25% grid offset, grid shift effect 1304 (FIG. 13C) represents a 10% grid offset, and grid shift effect 1306(FIG. 13D) represents a 100% grid offset.

Simulation Processes and Results

FIG. 14 is a flow diagram depicting an exemplary signal-to-interference-and-noise-ratio (SINR) determination process 1400 for adjacent channel networks. In some embodiments, process 1400 represents a standalone simulation process. In other embodiments, process 1400 may be executed in addition to or integrated with process 1100, FIG. 11, in a complementary manner. In an exemplary embodiment, process 1400 may be executed among and with respect to a first victim network (e.g., co-channel sector topology 508, FIG. 5A, victim network topology 1308, FIG. 13A) and a second interfering network (e.g., adjacent channel sector topology 804, FIG. 8A, interfering aggressor network topology 1310, FIG. 13A), and further may be executed by a processor disposed within a central office or a communications hub of a network operator, or disposed within one or more nodes or cellular base stations.

Unless described below to the contrary, one or more of the several steps, subprocesses, and/or subroutines of process 1400 may be performed in a different order, and/or two or more of the several steps/subprocesses/subroutines may be performed simultaneously.

In exemplary operation, process 1400 begins at step 1402, in which a network grid is generated. In an exemplary embodiment of step 1402, the network grid is generated to include 19 cellular sites, with three hexagonal sectors distributed rotationally about each of the 19 cellular sites (e.g., inter-site distribution scheme 500, FIG. 5A). In step 1404, process 1400 generates a plurality of random victim UE locations for the first victim network (e.g., victim device distribution 900, FIG. 9A). In step 1406, process 1400 calculates the received power and SNR in both the DL and UL. In step 1408, process 1400 determines the co-channel intra-network TDD interference, and in step 1410, process 1400 determines the adjacent inter-network channel TDD interference. In step 1412, process 1400 combines the co-channel TDD interference determined from step 1408 and the adjacent channel TDD interference determined from step 1410. In step 1414, process 1400 calculates the SINR from the combined co-channel/adjacent channel TDD interferences.

In step 1416, process 1400 determines the adjacent inter-network SBFD interference. In step 1418, process 1400 combines the co-channel intra-network TDD interference determined from step 1408 with the adjacent-channel inter-network SBFD interference determined from step 1416. In step 1420, the SINR is re-calculated from the combined co-channel TDD interference with the adjacent channel SBFD interference. In step 1422, the re-calculated SINR is converted to throughput. In step 1424, the SINR calculated from step 1414 is compared with the SINR re-calculated from step 1420, and a throughput degradation point is determined based on this comparison and the converted throughput from step 1422. In an exemplary embodiment of step 1424, the throughput degradation point is determined at 5%, 50%, and 95%.

FIG. 15 is a flow diagram depicting an alternative SINR determination process 1500 for adjacent channel networks. Similar to process 1400, FIG. 14, process 1500 may also be a standalone simulation process, or may be executed in addition to or integrated with one or more steps of processes 1400 and/or 1100, FIG. 11. Also similar to process 1400, process 1500 may be executed with respect to a first victim network (e.g., co-channel sector topology 508, FIG. 5A, victim network topology 1308, FIG. 13A) and a second interfering network (e.g., adjacent channel sector topology 804, FIG. 8A, interfering aggressor network topology 1310, FIG. 13A), and further may be executed by a processor disposed within a central office or a communications hub of a network operator, or disposed within one or more nodes or cellular base stations.

Unless described below to the contrary, one or more of the several steps, subprocesses, and/or subroutines of process 1500 may be performed in a different order, and/or two or more of the several steps/subprocesses/subroutines may be performed simultaneously. In exemplary operation, process 1500 begins at step 1502, in which a first simulation iteration i is executed with respect to a first subprocess 1502, a second subprocess 1504, and a third process 1506.

In the exemplary embodiment depicted in FIG. 15, first subprocess 1502 begins at step 1508, in which one cellular site of the first victim network is assigned as the victim center cell (e.g., first cellular site 502(1), FIG. 5A), and then generates one or more random UE locations (e.g., victim device distribution 900, FIG. 9A) within a first hexagonal sector (e.g., first sector 510(1), FIG. 5B) of the victim center cell, which then becomes the central victim sector. In step 1510, first subprocess 1502 determines one or more of the path loss, the UE power control, and the gain for the victim center cell. In step 1512, first subprocess 1502 determines the signal level arriving at the victim center cell/central sector and calculates the SNR therefor.

In an exemplary embodiment, the SNR may be calculated from the power spectrum density of the received signal, $P_r$, and a noise value N. For example, the received signal power $P_r$ may be calculated according to the equation:

$$P_T = P_t + G_t(\theta) + G_r(\theta) - PL(d) - O2I - \text{Shadow} - \text{Fading}, \quad \text{(Eq. 2)}$$

where $P_t$ indicates the transmission power, and $G_t$ and $G_r$ represent the transmitter gain and the receiver gain, respectively. Path loss (PL), O2I, shadow, and fading are discussed above. Additionally, the received noise value N may be calculated according to the equation:

$$N = -174 + 10 \times \log_{10}(BW) + NF, \quad \text{(Eq. 3)}$$

where BW represents the bandwidth of the signal (e.g., 10 MHz), and NF represents the noise floor (e.g., in dBm/10 MHz). From the power of the received signal $P_r$ and the noise value N, SNR may be calculated (e.g., in dB) according to:

$$SNR = P_r - N, \quad \text{(Eq. 4)}$$

In further exemplary operation, second subprocess 1504 begins at step 1514, in which a number of cellular sites or base stations are established that are co-channel with the victim center cell. In an exemplary embodiment, step 1514 is executed with respect to a first sub-iteration j for the first co-channel base station. For example, in the case of a victim cellular network topology having 19 cellular sites/base stations (e.g., cellular sites 502 of inter-site distribution scheme 500, FIG. 5A), there will be 18 base stations co-channel with the victim center cell. In step 1516, second subprocess 1504 establishes a number of hexagonal sectors for the base station selected in step 1514 of the co-channel network of the victim center cell, which then may be executed with respect to a first sub-iteration k of the sector for the particular base station j. For example, for 19 co-channel base stations, each such base station may be enclosed by three hexagonal sectors (e.g., sectors 510, FIG. 5B), thereby establishing 57 total sectors for this particular network topology (i.e., one victim central sector with 56 co-channel sectors). In step 1518, second subprocess 1504 generates one or more random UE locations (e.g., victim device distribution 900, FIG. 9A) within the sector iterated in step 1516 (e.g., sector/$BS_j$).

In step 1520, second subprocess 1504 determines one or more of the path loss, the UE power control, and the gain for the sector iterated from step 1516 according to the base station iterated from step 1514 (e.g., sector$_k$/$BS_j$/iteration$_i$). In step 1520, second subprocess 1504 determines one or more of the path loss and the gain of the sector k to the victim center cell. In step 1524, second subprocess 1504 determines the co-channel intra-network interference for the sector$_k$/$BS_j$ based on the results from steps 1520 and 1522. Step 1526 is a decision step. If, in step 1526, second subprocess 1504 confirms that the co-channel intra-network interference has been determined for all sectors of the particular iterated BS (e.g., three sectors per base station, in this example), second subprocess 1504 proceeds to step 1528. If, however, all sectors surrounding the base station have not been evaluated, second subprocess 1504 increments the value of k by 1, and then repeats steps 1516 through 1524 for the new sector of that co-channel base station (e.g., sector$_{k+1}$/$BS_j$/iteration$_i$). In this example, steps 1516 through 1524 would be executed three times for each base station.

Step 1528 is also a decision step. If, in step 1528, second subprocess 1504 confirms that the co-channel intra-network interference has been determined for all sectors (e.g., 57) of all base stations (e.g., 19), second subprocess 1504 proceeds to step 1530. If, however, all co-channel base stations have not been evaluated, second subprocess 1504 increments the value of j by 1, and then repeats steps 1514 through 1526 for the new base station (e.g., sector$_k$/$BS_{j+1}$/iteration$_i$). In this example, steps 1514 through 1526 would be executed 19 times total, with steps 1516 through 1524 being executed 57 times total. In step 1530, second subprocess 1504 aggregates the co-channel interference from all 56 sectors that are co-channel with the victim central sector.

In further exemplary operation, third subprocess 1506 begins at step 1532, in which a number of cellular sites or base stations are established for the adjacent channel. In an exemplary embodiment, step 1532 is executed with respect to a first sub-iteration m for the first adjacent channel base station (e.g., 19 adjacent cellular sites 808, FIG. 8B), similar to step 1514 of second subprocess 1504. In step 1534, third subprocess 1506 establishes a number of hexagonal sectors (e.g., 3) for the base station selected in step 1532 of the adjacent channel network, which then may be executed with respect to a first sub-iteration n of the sector for the particular base station m, similar to step 1516 of second subprocess 1504. In step 1536, third subprocess 1506 generates one or more random UE locations within the sector iterated in step 1534 (e.g., sector$_n$/BS$_m$).

In step 1538, third subprocess 1506 determines one or more of the path loss and the victim base station gain for the sector iterated in step 1534 (e.g., sector$_n$/BS$_m$/iteration$_i$). In step 1540, third subprocess 1506 determines the inter-network interference for the sector$_n$/BS$_m$ based on the result from step 1538. In an exemplary embodiment of step 1538, the inter-network interference includes one or more of the ACLR, ACS, and ACIR. Step 1542 is a decision step. If, in step 1542, third subprocess 1506 confirms that that the adjacent channel inter-network interference has been determined for all sectors of the particular iterated BS, third subprocess 1506 proceeds to step 1544. If, however, all sectors surrounding the base station have not been evaluated, third subprocess 1506 increments the value of n by 1, and then repeats steps 1534 through 1540 for the new sector of that base station (e.g., sector$_{n+1}$/BS$_m$/iteration$_i$), similar to step 1526 of second subprocess 1504.

Step 1544 is also a decision step. If, in step 1544, third subprocess 1506 confirms that that the adjacent channel inter-network interference has been determined for all sectors (e.g., m=an integer value of 1-57) of all base stations (e.g., n=an integer value of 1-19), third subprocess 1506 proceeds to step 1546. If, however, all adjacent channel base stations have not been evaluated, third subprocess 1506 increments the value of m by 1, and then repeats steps 1532 through 1542 for the new base station (e.g., sector$_n$/BS$_{m+1}$/iteration$_i$), similar to step 1528 of second subprocess 1504. In step 1546, third subprocess 1506 aggregates the adjacent channel interference from all sectors (e.g., 57) adjacent the network topology of the victim central sector.

In an exemplary embodiment, in the case of TDD and SBFD coexistence, third subprocess 1506 may be executed twice for each iteration, i.e., once for legacy TDD adjacent channel interference, and then again for SBFD adjacent channel interference. In this scenario, step 1546 of the first execution of third subprocess 1506 will produce an aggregated adjacent channel inter-network TDD interference value for each iteration i, and the second execution of third subprocess 1506 will produce an aggregated adjacent channel inter-network SBFD interference value for each iteration i.

In step 1548, process 1500 takes the results from each of first, second, and third subprocesses (e.g., from steps 1512, 1530, 1546) and aggregates the co-channel intra-network interference, the adjacent channel inter-network interference (e.g., both TDD and SBFD, in the coexistence scenario), and the SINR for the particular iteration i. Step 1550 is a decision step. In an exemplary embodiment of step 1548, the co-channel SINR (in dB) may be calculated according to:

$$SINR_{cc} = \frac{P_r}{10 \times \log_{10}(I_{linear} + N_{linear})},$$ (Eq. 5)

where I$_{linear}$ is the aggregated co-channel interference and N$_{linear}$ is the aggregated co-channel noise. In similar manner, the adjacent channel SINR may be calculated according to:

$$SINR_{ac} = 10 \times \log_{10}\left(\frac{P_{r,linear}}{I_{linear} + I_{ACIR,linear} + N_{linear}}\right),$$ (Eq. 6)

24 where I$_{ACIR,linear}$ is the aggregated adjacent channel interference.

If, in step 1550, process 1500 confirms that all desired iterations have been completed (note that one exemplary simulation described above executed one million iterations), process 1500 proceeds to step 1552. If, however, all iterations have not been executed, process 1500 increments the value of i by 1, and then returns to step 1502 (e.g., iteration$_{i+1}$). In step 1552, process 1500 generates an SINR CDF for all iterations of process 1500.

In an embodiment, process 1500 may be further configured to execute an additional optional step 1554, in which shadowing in paths from the same UE or base station may be correlated. In an exemplary embodiment of step 1554, process 1500 correlates, for each iteration i, the results of steps 1510, 1520, 1522, and 1538. In an embodiment, in the case where cell re-selection may occur, process 1500 may be further configured to execute an additional optional step 1556, in which the UE location(s) may be regenerated. In an exemplary embodiment of step 1556, UE regeneration may be executed with respect to steps 1512 and 1524.

ACIR Analysis

The several 3GPP TSs, TRs, and R4s incorporated above define the ACLR as the adjacent channel leakage ratio inside a band. In most conventional cases, the ACLR is 45 dB, including for the 3.4 GHz band, and up to the CBRS band for many interference cases. In the case of a CBRS Cat-A wide area base station, the less stringent of the ACLR and the absolute limit of −13 dBm/MHz would be applied. The purposes of the exemplary embodiments herein, the less stringent 45 dB ACLR is applied. The person of ordinary skill in the art will understand that this application is made by way of illustration, and is not intended to be limiting.

Nevertheless, the present embodiments are advantageously configured to calculate the ACLR differently than how the value is defined by 3GPP. That is, the present systems and methods provide a new alternative ACLR calculation technique. In an exemplary embodiment, the ACLR may be calculated as a relative value for an out-of-band emission (OoBE) limit, such as according to:

$$ACLR = \max(ACLR_{3GPP}, P_{TX} - OOBE),$$ (Eq. 7)

where the base station ACLR in FR1 is assumed to be frequency-flat. Based on this assumption, in the case where the aggressor bandwidth is narrower than the victim bandwidth (e.g., an SBFD gNB is greater than a legacy TDD gNB), an equivalent ACLR will be equal to a normal ACLR value. However, in the case where the aggressor bandwidth is wider than the victim bandwidth (e.g., the legacy TDD gNB is greater than the SBFD gNB), the total received interference will be P$_{Tx}$, minus the ACLR, plus the ratio of aggressor-bandwidth-to-victim-bandwidth. For example, in the case where the aggressor bandwidth is 100 MHz and the victim bandwidth is 20 MHz, the equivalent ACLR would be 45+10*log 10(100/20)=51.9 dB.

In an exemplary embodiment the UE ACLR may be modeled as 30 dB at maximum power, thereby improving 1 dB/dB with backoff up to a maximum 10 dB of improvement. Accordingly, at a 10 dB backoff, the ACLR would be 40 dB. Alternatively, the ACS and ACLR of the respective base stations and UEs may be according to Table 1, below.

TABLE 1

| PARAMETER | ASSUMPTION/VALUE |
|---|---|
| BS ACLR | 45 dBc |
| BS ACS | 46 dBc |
| UE ACLR | 30 dBc ($ACLR_1$) |
|  | 43 dBc ($ACLR_2$) |
| UE ACS | 33 dBc |

For Table 1, the UE-UE CLI may be first evaluated utilizing the $ACLR_1$ parameter only, and then re-evaluated using the $ACLR_2$ parameter if the UE-UE CLI is significant.

FIG. 16 is a graphical illustration depicting an exemplary SINR plot 1600 for adjacent channels (e.g., FIGS. 8A-10D, 12A-13D). In the exemplary embodiment depicted in FIG. 16, plot 1600 illustrates power against frequency for an aggressor transmitter 1602 (e.g., OoBE interferer) operating in an aggressor channel/band 1604 adjacent to a victim channel/band 1606 of a victim receiver 1608. In an embodiment, transmission leakage from aggressor channel 1604 into adjacent victim channel 1606. That is, victim receiver 1608 may collect signals from adjacent aggressor channel/band 1604 that will impact the performance of the in-band victim signal within victim channel/band 1606.

In an embodiment, aggressor transmitter 1602 may employ a transmission mask 1610 (e.g., a bandpass filter (BPF)) to enable transmission within aggressor channel 1604 while suppressing the power of the transmission outside of aggressor channel 1604. Similarly, victim receiver 1608 may employ a receiver filter 1612 (e.g., BPF) to enable reception of signals within victim channel 1606 while suppressing reception of signals outside of victim channel 1606. As illustrated in FIG. 16, ACS 1614 may be seen for an area under which transmission mask 1610 and receiver filter 1612 overlap within aggressor channel 1604, and ACLR 1616 may be seen for an area under which transmission mask 1610 and receiver filter 1612 overlap within victim channel 1606. In some cases, the interference may be mitigated by one or both of a more stringent OoBE and a lower in-band transmitter power. In an exemplary embodiment, the present embodiments achieve the target 6 dB SINR degradation (4.7 dB I/N) specified by 3GPP.

Adjacent Channel SINR

As described above, the power spectrum density of the received signal may be expressed, in dBm/10 MHz, according to Eq. 2, and the noise may be expressed as follows:

$$N = -174 + 10 \times \log_{10}(BW) + NF \quad \text{(Eq. 8)}$$

In an exemplary embodiment, Eq. 8 may consider the bandwidth (BW) to be 10 MHz, and the noise floor (NF) may then be expressed in dBm/10 MHz. From Eq. 8, the ACI (e.g., from a kth interferer) may be expressed, also in dBm/10 MHz, as follows:

$$I_{ACLR} = P_t - ACLR + G_t(\theta) + G_r(\theta) - L(d) - O2I - \text{Shadow} - \text{Fading}, \quad \text{(Eq. 9)}$$

$$I_{ACS} = P_t + G_t(\theta) + G_r(\theta) - L(d) - O2I - \text{Shadow} - \text{Fading} - ACS. \quad \text{(Eq. 10)}$$

Accordingly, the aggregated adjacent-channel interference may be represented by:

$$I_{ACIR,linear} = \sum_{k=1}^{M} I_{ACIR,k,linear}, \quad \text{(Eq. 11)}$$

and the SINR (in dB) may be calculated as:

$$SINR = 10 \times \log_{10}\left(\frac{P_{r,linear}}{I_{linear} + I_{ACIR,linear} + N_{linear}}\right) \quad \text{(Eq. 12)}$$

ACIR Calculations

In a first exemplary embodiment, the ACIR may initially be determined using Eq. 1, thus enabling the interfering ACIR to be calculated according to:

$$I_{ACIR} = \frac{P_t / CL}{ACIR} = P_t \left/ CL\left(\frac{1}{ACLR} + \frac{1}{ACS}\right)\right., \quad \text{(Eq. 13)}$$

where the ACIR, ACLR, and ACS have relative values in a linear scale (e.g., Eq. 1, converted from dB to linear), and where $I_{ACIR}$, $L_{ACLR}$ and $I_{ACS}$ may be expressed in mW.

In a second exemplary embodiment, the interfering ACIR may be calculated according from:

$$dI_{ACLR} = \frac{P_t / CL}{ACLR}, \quad \text{(Eq. 9)}$$

$$I_{ACS} = \frac{P_t / CL}{ACS}, \text{ and} \quad \text{(Eq. 10)}$$

$$I_{ACIR} = I_{ACLR} + I_{ACS} = P_t \left/ CL\left(\frac{1}{ACLR} + \frac{1}{ACS}\right)\right., \quad \text{(Eq. 11)}$$

where the transmitter power $P_t$ may be expressed in mW, and CL represents the coupling loss, in linear scale, which may include antenna gain.

UE ACLR Backoff

FIG. 17 is a graphical illustration depicting a comparative plot 1700 of adjacent channel leakage ratio for an exemplary wireless device. In the exemplary embodiment depicted in FIG. 17, comparative plot illustrates a first subplot 1702 illustrating UE ACLR (in dBc) against UE transmitter power (in dBm) for the FR1 scenario, and a second subplot 1704 illustrating UE ACLR against UE transmitter power for the FR2-1 scenario. For first subplot 1702 (i.e., FR1) the UE ACLR was modeled as 30 dB at maximum power, thus improving 1 dB/dB with backoff, up to a maximum 10 dB of improvement, for a 40 dB ACLR at 10 dB backoff. For second subplot 1704 (i.e., FR2-1) the UE ACLR was modeled as 24 dB at maximum power, thus improving 1 dB/dB with backoff, up to a maximum 10 dB of improvement, for a 34 dB ACLR at 10 dB backoff.

Base Station Receiver Blocking

FIG. 18A is a graphical illustration depicting an exemplary noise figure plot 1800 for a receiver blocking simulation model. In the exemplary embodiment depicted in FIG. 18A, plot 1800 incorporates the self-interference analysis (e.g., from the base station aspect) for SBFD operation included in the RAN4 R4-2302883, and further considers uplink reception impairment(s) due to receiver sensitivity, which may be based on linear and/or non-linear effects. For example, linear effects may be primarily due to crosstalk between subcarriers, which may be affected by (a) filtering, (b) how much OFDM symbol orthogonality exists between the aggressor interfering signal and the signal desired by the receiver (e.g., the victim signal), and (c) the frequency separation between the aggressor and victim subcarriers. In contrast, non-linear effects may be due to receiver densensitization caused by blocking in the receiver.

In an exemplary embodiment, the RAN4 receiver blocking simulation model represented by plot 1800 confirms the RAN1 assumption that base station in-channel selectivity (ICSBS) may be obtained from the value of the gNB ACS. For example, according to plot 1800, A may have a value of −43 dBm and B may have a value of −25 dBm, whereas C may have a value of 5 dB and D may have a value of 14 dB. In this example, a receiver may be blocked when the total input power received at that receiver is larger than the value of B (−25 dBm, in this example). Simulation results, using this model, are described further below with respect to FIG. 18B.

FIG. 18B is a graphical illustration depicting an exemplary comparative impairment plot 1802 utilizing noise figure plot 1800, FIG. 18A. In the exemplary embodiment depicted in FIG. 18B, simulations were conducted for four separate case scenarios, and the result thereof plotted, in comparative impairment plot 1802, as the respective noise figure (Y-axis) against the average total input/received power (X-axis), which represents the linear sum of all received power, including the desired (victim) signal, self-

TABLE 3

| Parameter (FR2-1) | Urban Macro | Urban Dense | Indoor |
|---|---|---|---|
| Option 1 Receiver noise figure parameters | $P_1 = -63$ dBm $P_2 = -45$ dBm $F_1 = 10$ dB $F_2 = 19$ dB | $P_1 = -63$ dBm $P_2 = -45$ dBm $F_1 = 10$ dB $F_2 = 19$ dB | $P_1 = -63$ dBm $P_2 = -45$ dBm $F_1 = 10$ dB $F_2 = 19$ dB |
| Option 2 Receiver noise figure parameters | $P_1 = -52$ dBm $F_1 = 10$ dB A sloped section rising by 1 dB/dB for $P_{in} > -52$ dBm | $P_1 = -52$ dBm $F_1 = 10$ dB A sloped section rising by 1 dB/dB for $P_{in} > -52$ dBm | $P_1 = -52$ dBm $F_1 = 10$ dB A sloped section rising by 1 dB/dB for $P_{in} > -52$ dBm |

Since the ACIR is based on the ACLR of the transmitter (e.g., ACLR 1616. FIG. 16) and the ACS of the receiver (e.g., ACS 1614, FIG. 16), the baseline ACLR. ACS, as well as the corresponding ACIR may be determined as shown further below in Table 4.

TABLE 4

| Case | Aggressor/ Victim | Baseline | | | Potential | | | ACIR |
|---|---|---|---|---|---|---|---|---|
| | | ACLR (dB) | ACS (dB) | ACIR (dB) | ACLR (dB) | ACS (dB) | Enhanced ACIR (dB) | Enhancement (dB) |
| 1 | SBFD UE to TDD UE | 30 | 33 | 28.2 | Ideal (e.g., 100 dB or infinite) | 33 | 33.0 | 4.8 |
| 2 | SBFD BS to TDD BS | 45 | 50 | 43.8 | Ideal (e.g., 100 dB or infinite) | 50 | 50.0 | 6.2 |
| 3 | TDD BS to SBFD BS | 45 | 50 | 43.8 | 45 | Ideal (e.g., 100 dB or infinite) | 45.0 | 1.2 |
| 4 | TDD UE to SBFD UE | 30 | 33 | 28.2 | 30 | Ideal (e.g., 100 dB or infinite) | 30.0 | 1.8 | interference, inter-gNB interference, and inter-sector interference. Accordingly, comparative impairment plot 1802 includes (i) a first subplot 1804 demonstrating the simulation results of a first exemplary case scenario for an FR1 UMa wide area base station, (ii) a second subplot 1806 of simulation results of a second case scenario for an FR1 UMi medium range base station, (iii) a third subplot 1808 of simulation results of a third case scenario for an FR1 indoor local area base station, and (iv) a fourth subplot 1810 of simulation results of a fourth case scenario for an FR2 base station.

Additional simulation results for these exemplary case scenarios are shown further below with respect to Tables 2 and 3.

TABLE 2

| Parameter (FR1) | Urban Macro (Wide Area) | Micro (Medium Range) | Indoor (Local Area) |
|---|---|---|---|
| Receiver noise figure model parameters | $P_1 = -33$ dBm $P_2 = -15$ dBm $F_1 = 5$ dB $F_2 = 14$ dB | $P_1 = -38$ dBm $P_2 = -20$ dBm $F_1 = 10$ dB $F_2 = 19$ dB | $P_1 = -35$ dBm $P_2 = -17$ dBm $F_1 = 13$ dB $F_2 = 22$ dB |

In an embodiment, the ACIR enhancements shown in Table 4 may be applied for the new SBFD gNB and UE embodiments described herein. That is, the ACIR enhancements may not apply to existing deployed legacy TDD gNBs and UEs.

Thus, case 1 of Table 4 shows results where an SBFD UE is the aggressor and a legacy TDD UE is the victim. In this case, the legacy ACS value (33 dB) for the victim TDD UE cannot be improved. Additionally, irrespective of the ACLR improvement amount on the aggressor SBFD UE, the ACIR value will still be limited to the ACS value (33 dB) of the legacy victim TDD UE. Accordingly, the ACIR enhancement for this case would not be expected to exceed 4.8 dB.

Case 2 of Table 4 shows results where an SBFD gNB is the aggressor and a legacy TDD gNB is the victim. Similar to case 1, the legacy ACS value (50 dB) for the victim TDD gNB cannot be improved. Additionally, irrespective of the ACLR improvement amount on the aggressor SBFD gNB, the ACIR value will still be limited to the ACS value (50 dB) of the legacy victim TDD gNB. Accordingly, the ACIR enhancement for this case would not be expected to exceed 6.2 dB.

Case 3 of Table 4 shows results where a legacy TDD gNB is the aggressor and an SBFD gNB is the victim. In this case, the legacy ACLR value (45 dB) for the aggressor TDD gNB cannot be improved. Additionally, irrespective of the ACS improvement amount on the victim SBFD gNB, the ACIR value will still be limited to the ACLR value (45 dB) of the legacy aggressor TDD gNB. Accordingly, the ACIR enhancement for this case would not be expected to exceed 1.2 dB.

Case 4 of Table 4 shows results where a legacy TDD UE is the aggressor and an SBFD UE is the victim. In this case, the legacy ACLR value (30 dB) for the aggressor TDD UE cannot be improved. Additionally, irrespective of the ACS improvement amount on the victim SBFD UE, the ACIR value will still be limited to the ACLR value (45 dB) of the legacy aggressor TDD UE. Accordingly, the ACIR enhancement for this case would not be expected to exceed 1.8 dB.

Thus, according to the embodiments described above, innovative systems and methods are provided for performing and analyses for TDD/SBFD coexistence scenarios. In exemplary embodiments, new and advantageous techniques are provided for UMa-UMi scenarios, which heretofore had not been considered. Since there presentation, the present embodiments have been included in recent versions of 3GPP TR 38.858.

Exemplary embodiments of systems, methods, and analysis techniques for network coexistence are described above in detail. The several examples above are described with respect to 3GPP and 5G capabilities, but the person of ordinary skill in the art will understand that the principles herein are not exclusive to new radio (NR), or 6G, or other developing technology standards. Additionally, the systems and methods of this disclosure are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of analyzing interference for a first cellular network overlapping an adjacent second cellular network, comprising the steps of:

determining a first distribution of co-channel cellular sites for the first cellular network, wherein each co-channel cellular site of the first distribution is separated from a nearest other co-channel cellular site by a first inter-site distance (ISD);

establishing a first co-channel cellular site of the first distribution as a center cell;

measuring co-channel interference from each other co-channel cellular site with respect to the center cell;

determining a second distribution of adjacent channel cellular sites for the second cellular network, wherein each adjacent channel cellular site of the second distribution is separated from a nearest other adjacent channel cellular site by a second ISD;

measuring adjacent channel interference from each adjacent channel cellular site with respect to the center cell; and aggregating the measured co-channel interference with the measured adjacent channel interference.

2. The method of claim 1, further comprising a step of determining a grid offset between the first and second cellular networks based on a distance between the center cell and a nearest adjacent channel cellular site of the second distribution.

3. The method of claim 2, wherein the second ISD is greater than the first ISD.

4. The method of claim 3, further comprising a step calculating a grid shift effect based on a percentage of the distance between the center cell and the nearest adjacent channel cellular site from the determined grid offset.

5. The method of claim 4, wherein the percentage of the distance between the center cell and the nearest adjacent channel cellular site is one of 100, 50, 25, 10, and 5.

6. The method of claim 2, wherein the second ISD is the same as the first ISD.

7. The method of claim 6, further comprising a step calculating a grid shift effect based on a percentage of the first ISD.

8. The method of claim 7, wherein the percentage of the first ISD is one of 100, 50, 25, 10, and 5.

9. The method of claim 1, wherein the step of measuring co-channel interference includes a substep of calculating co-channel intra-network time division duplex (TDD) interference.

10. The method of claim 9, wherein the step of measuring adjacent channel interference includes a substep of calculating adjacent channel inter-network TDD interference.

11. The method of claim 9, wherein the step of measuring adjacent channel interference includes a substep of calculating adjacent channel inter-network sub-band full duplex (SBFD) interference.

12. The method of claim 1, further comprising a step of defining three adjoining co-channel sectors about each co-channel cellular site of the first distribution.

13. The method of claim 12, further comprising a step of assigning random simulated user equipment (UE) locations throughout a first co-channel sector of the center cell.

14. The method of claim 13, wherein the step of assigning random simulated UE locations includes indoor UE locations and outdoor UE locations within the first co-channel sector.

15. The method of claim 14, wherein the outdoor UE locations are uniformly distributed throughout the first co-channel sector.

16. The method of claim 14, further comprising a step of generating at least one UE cluster within the first co-channel sector and within an adjacent channel sector corresponding to at least one adjacent channel cellular site proximate the center cell.

17. The method of claim 16, wherein the indoor UE locations are uniformly distributed throughout the at least one UE cluster.

\* \* \* \* \*